United States Patent
Krasnopolski et al.

(10) Patent No.: US 12,312,108 B2
(45) Date of Patent: May 27, 2025

(54) LOGISTICS STATION FOR DRONES

(71) Applicant: DPENDENT—DRONE INDEPENDENT SYSTEM SÀRL, Cully (CH)

(72) Inventors: Krzysztof Krasnopolski, Alpnach Dorf (CH); Loïc Desfayes, Cully (CH); Lucien Moser, Cheseaux-sur-Lausanne (CH)

(73) Assignee: DPENDENT—DRONE INDEPENDENT SYSTEM SÀRL, Cully (CH)

( * ) Notice: Subject to any disclaimer, the term of this patent is extended or adjusted under 35 U.S.C. 154(b) by 0 days.

(21) Appl. No.: 18/026,366

(22) PCT Filed: Sep. 15, 2021

(86) PCT No.: PCT/IB2021/058399
§ 371 (c)(1),
(2) Date: Mar. 15, 2023

(87) PCT Pub. No.: WO2022/058903
PCT Pub. Date: Mar. 24, 2022

(65) Prior Publication Data
US 2023/0348121 A1 Nov. 2, 2023

(30) Foreign Application Priority Data
Sep. 16, 2020 (WO) .................. PCT/IB2020/058619

(51) Int. Cl.
*B64U 70/99* (2023.01)
*B60L 53/80* (2019.01)
(Continued)

(52) U.S. Cl.
CPC .............. *B64U 70/99* (2023.01); *B60L 53/80* (2019.02); *B64F 1/22* (2013.01); *B64F 1/362* (2013.01);
(Continued)

(58) Field of Classification Search
CPC ........ B64U 70/99; B64U 70/93; B64U 70/97; B64U 80/25; B64U 2201/10; B60L 53/80;
(Continued)

(56) References Cited

U.S. PATENT DOCUMENTS 4,123,020 A * 10/1978 Korsak .................. B64F 1/125
244/116
5,039,034 A *  8/1991 Burgess ................. B64F 1/125
114/261

(Continued)

FOREIGN PATENT DOCUMENTS

| | | |
|---|---|---|
| CN | 109502039 | 3/2019 |
| CN | 211139697 | 7/2020 |
| WO | 2019/211558 | 11/2019 |

OTHER PUBLICATIONS

International Search Report for PCT/IB2021/058399, mailed Jan. 12, 2022, 5 pages.
(Continued)

Primary Examiner — Medhat Badawi
(74) Attorney, Agent, or Firm — NIXON & VANDERHYE

(57) ABSTRACT

The invention relates to a logistics station for drones, which can be adapted to different drones (12) and comprises at least one landing zone including means for holding a drone, a robot (30) for replacing the drone batteries and/or charging the drone, and a battery store (20).

19 Claims, 23 Drawing Sheets

(51) Int. Cl.
  *B64F 1/22* (2006.01)
  *B64F 1/36* (2017.01)
  *B64U 70/93* (2023.01)
  *B64U 70/97* (2023.01)
  *B64U 80/25* (2023.01)

(52) U.S. Cl.
  CPC ............ *B64U 70/93* (2023.01); *B64U 70/97* (2023.01); *B64U 80/25* (2023.01); *B60L 2200/10* (2013.01)

(58) Field of Classification Search
  CPC ........ B60L 2200/10; B60L 53/14; B64F 1/22; B64F 1/362; B64F 1/222; Y02T 10/70; Y02T 10/7072; Y02T 90/14
  See application file for complete search history.

(56) References Cited

U.S. PATENT DOCUMENTS

| | | | | |
|---|---|---|---|---|
| 8,955,800 B2* | 2/2015 | McGeer | ............... | B64C 39/024 244/116 |
| 9,387,928 B1* | 7/2016 | Gentry | ............... | G08G 5/0039 |
| 9,527,605 B1* | 12/2016 | Gentry | ............... | F21S 8/086 |
| 10,124,912 B2* | 11/2018 | Walsh | ............... | B64C 39/024 |
| 10,195,629 B1* | 2/2019 | Dahlstrom | ............ | B64C 39/022 |
| 10,488,512 B1* | 11/2019 | Pounds | ............... | G05D 1/0022 |
| 11,111,033 B1* | 9/2021 | Burks | ............... | B64F 1/222 |
| 11,597,291 B1* | 3/2023 | Bikumala | ........... | G06F 13/4282 |
| 11,636,771 B2* | 4/2023 | Barker | ............... | B64C 39/024 701/16 |
| 11,685,275 B1* | 6/2023 | Wiegman | ............ | B60L 53/305 320/109 |
| 11,708,000 B2* | 7/2023 | Wiegman | ............... | B60L 58/16 320/109 |
| 11,814,241 B2* | 11/2023 | Tian | ............... | B65D 90/14 |
| 11,866,168 B2* | 1/2024 | Cooper | ............... | B64F 1/222 |
| 11,884,422 B2* | 1/2024 | Lowe | ............... | H05K 7/20154 |
| 11,912,438 B2* | 2/2024 | Wankewycz | ........... | B64D 27/24 |
| 11,958,602 B2* | 4/2024 | Ye | ............... | B64C 39/024 |
| 11,993,373 B2* | 5/2024 | Blakstad | ............... | B64D 27/24 |
| 2014/0124621 A1* | 5/2014 | Godzdanker | ............ | B64F 1/28 244/110 E |
| 2015/0336669 A1* | 11/2015 | Kantor | ............... | G01C 21/343 701/3 |
| 2016/0001883 A1* | 1/2016 | Sanz | ............... | H02J 7/0044 244/17.23 |
| 2016/0011592 A1* | 1/2016 | Zhang | ............... | B64C 39/024 244/114 R |
| 2016/0144982 A1* | 5/2016 | Sugumaran | ............... | B64F 1/12 244/108 |
| 2016/0257426 A1* | 9/2016 | Mozer | ............... | B64F 1/22 |
| 2017/0038778 A1* | 2/2017 | Wang | ............... | G05D 1/102 |
| 2017/0050749 A1* | 2/2017 | Pilskalns | ............... | B64F 1/12 |
| 2017/0073084 A1* | 3/2017 | Mozer | ............... | B64U 80/25 |
| 2017/0104426 A1* | 4/2017 | Mills | ............... | H01L 31/0549 |
| 2017/0107001 A1* | 4/2017 | Barnes | ............... | B64F 1/22 |
| 2017/0144776 A1* | 5/2017 | Fisher | ............... | B64F 1/24 |
| 2017/0253349 A1* | 9/2017 | Wang | ............... | B64U 70/97 |
| 2018/0029723 A1* | 2/2018 | Krauss | ............... | B64C 39/024 |
| 2018/0039286 A1* | 2/2018 | Tirpak | ............... | G05D 1/0653 |
| 2018/0208070 A1* | 7/2018 | Sanchez | ............... | B64C 39/024 |
| 2018/0327091 A1* | 11/2018 | Burks | ............... | B64C 39/024 |
| 2019/0002127 A1* | 1/2019 | Straus | ............... | B64U 50/37 |
| 2020/0001735 A1* | 1/2020 | Cheng | ............... | B64U 80/25 |
| 2020/0031466 A1* | 1/2020 | Anderson | ............... | B64U 70/90 |
| 2020/0207230 A1* | 7/2020 | Evans | ............... | B60L 53/50 |
| 2020/0207485 A1* | 7/2020 | Foggia | ............... | B64F 1/222 |
| 2020/0239160 A1* | 7/2020 | Cheng | ............... | B64U 70/99 |
| 2020/0310465 A1* | 10/2020 | Carthew | ............... | B64U 70/92 |
| 2021/0031947 A1* | 2/2021 | Wankewycz | ............... | B60L 50/60 |
| 2021/0078704 A1* | 3/2021 | Blakstad | ............... | B60L 50/66 |
| 2023/0348121 A1* | 11/2023 | Krasnopolski | ............... | B64U 70/99 |

OTHER PUBLICATIONS

Written Opinion of ISA for PCT/IB2021/058399, mailed Jan. 12, 2022, 6 pages.

\* cited by examiner

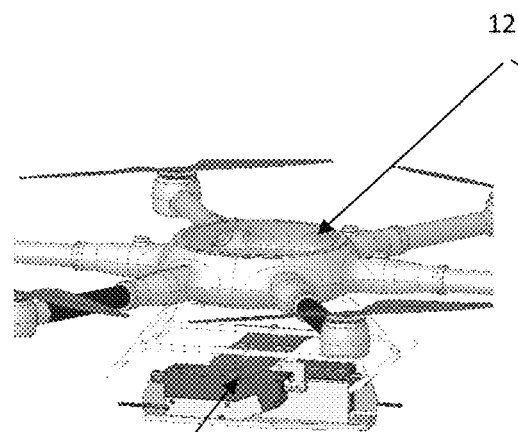
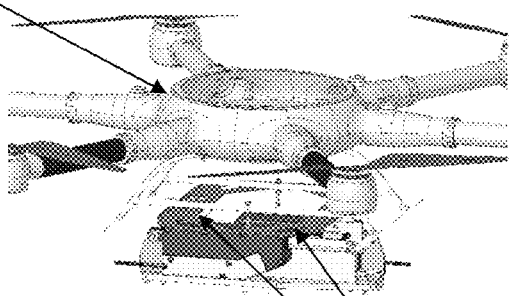
Figure 24A    Figure 24C
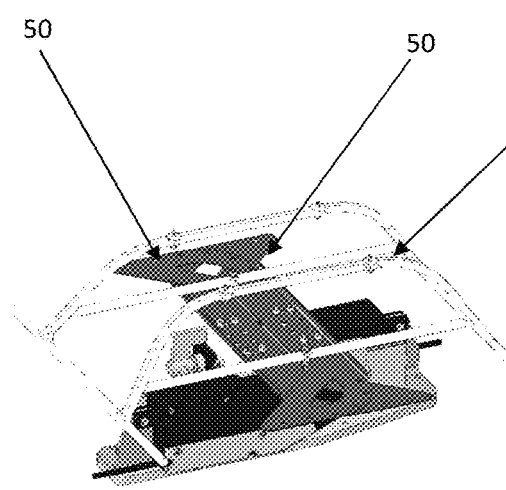
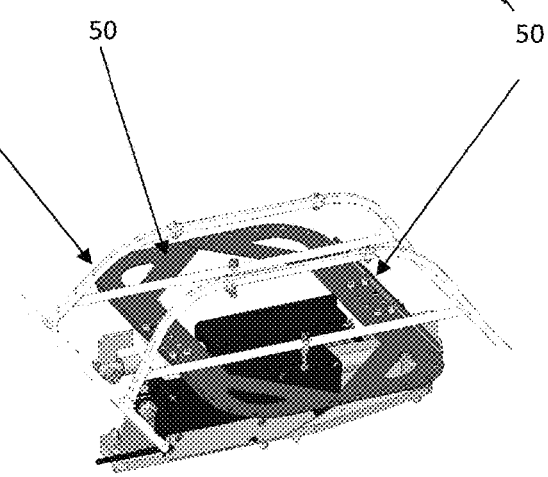
Figure 24B    Figure 24D

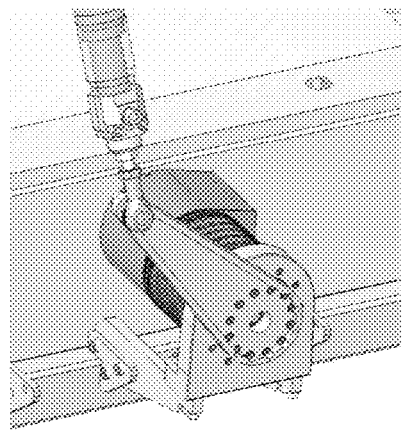 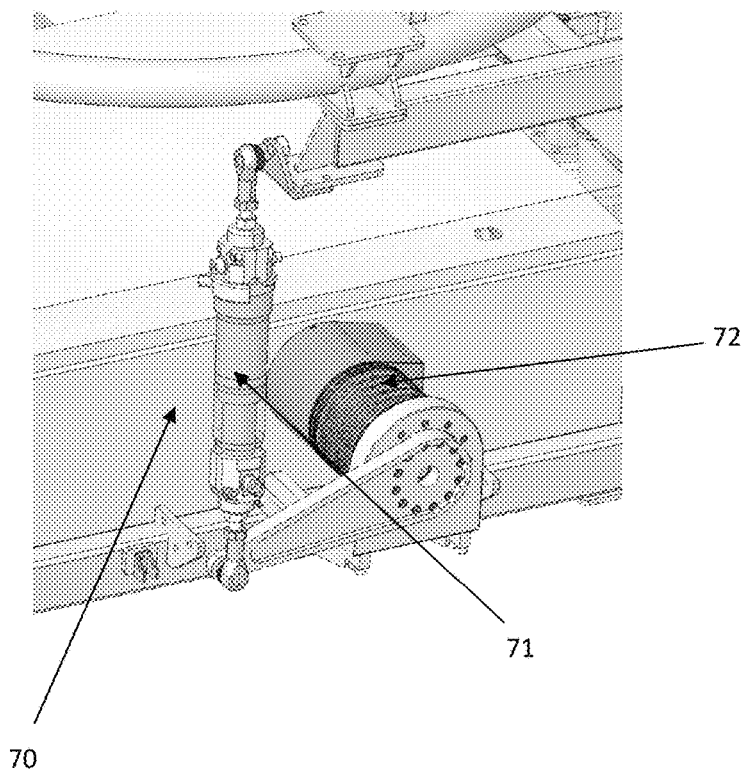
Figure 28J                    Figure 28K

LOGISTICS STATION FOR DRONES

CORRESPONDING APPLICATIONS

This application is the U.S. national phase of International Application No. PCT/IB2021/058399 filed Sep. 15, 2021, which designated the U.S. and claims priority to international application No. PCT/IB2020/058619 filed Sep. 16, 2020, the contents of each of which are hereby incorporated by reference.

TECHNICAL FIELD

The present invention relates to a station, preferably a mobile station, and the elements of such a station capable of accommodating several types of drones and of performing several functions/actions on the drone and parts of the drone. The system is notably capable of placing the drones in a defined position, of locking the drone in the station, of extracting the battery or batteries from the drone, of inserting a full battery or batteries in the drone and of charging the batteries extracted in an independent manner.

In addition, the system makes it possible to load and/or unload various loads such as parcels, seeds, treatment liquids or any other load from the drone.

The station is preferably equipped with an intelligent battery charging system optimizing battery life and a programmable robot capable of handling any type of payload. The invention also relates to a universal battery shell/cage system, easy to insert/un-insert, connect/disconnect, thus making it possible to handle the batteries by a robot and consequently to manage and handle the said batteries automatically.

The station can be used as an intermediate station in a network of several drones or in a system comprising one station per drone. The station can be fixed or mobile, for example mounted on a vehicle. Preferably, the station can adapt to different drones, for example of different construction and/or of different size.

An aim of the present invention is to improve the systems known from the state of the art.

Another aim of the present invention is to propose a system and means allowing automated management of drones of several types, shapes and sizes.

Another aim of the present invention is to propose means of production which are simple and reliable.

Other aims and advantages of the present invention flow from the following description of various embodiments of the invention. In the present description, the application to a drone has been mainly described, but the present invention can be used with other flying vehicles capable of landing on the station described and of taking off like a helicopter or other equivalent.

EMBODIMENTS OF THE INVENTION

The appended figures show illustrative embodiments of the present invention.

FIGS. 8 to 15 illustrate batteries and their mounting in one embodiment of the invention.

FIGS. 24A to 24D illustrate one embodiment of fastening means according to the invention.

FIGS. 28A to 28K illustrate an embodiment according to the invention of means allowing the orientation of a drone, for example to maintain its horizontality.

Figure 1:
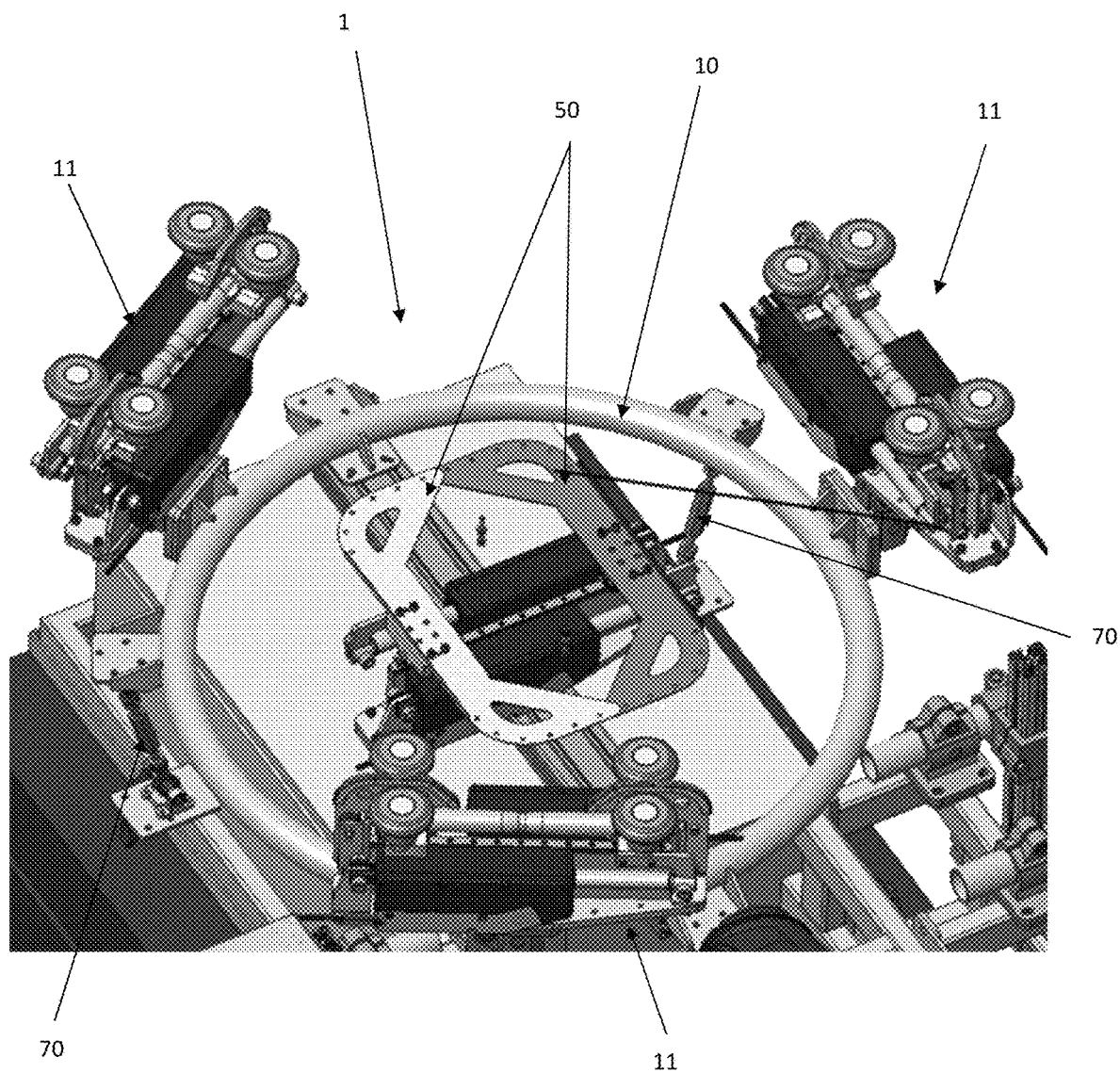
FIG. 1 illustrates an embodiment of the invention.

In embodiments, the logistics station according to the invention is provided for flying electric vehicles, such as a drone, with at least one battery, the station being adaptable to different flying vehicles and comprising at least one landing zone having means for maintaining the flying vehicle, a robot intended to exchange the batteries of the flying vehicle and/or a charge of the flying vehicle and a tank/battery charger.

In embodiments, the station includes a part in the form of a circle to support the flying vehicle in the landing and take-off zone.

In embodiments, the holding means comprise at least three locking systems.

In embodiments, the holding means comprise two plates that are movable relative to each other.

In embodiments, said circle and the holding means are fixed in the station or can move along one or more axes actuated by orientation means.

In embodiments, the orientation means comprise actuators or motors coupled to supports.

In embodiments, the locking means are moved according to the position of the circle.

In embodiments, when the circle is in a high position, the locking means are in an open position and when the circle is in a low position, the locking means are in a locked position.

In embodiments, the station comprises at least one battery storage and charging zone.

In embodiments, batteries are mounted in a cage with a universal attachment system.

In embodiments, the station includes a robot with at least one finger to move the batteries in the station.

In embodiments, the station comprises means for centering the flying vehicle.

In embodiments, the station includes a motion detection sensor.

In embodiments, the station includes a dome to maintain constant flight conditions during take-off and landing.

In embodiments, the locking of the batteries is ensured by a guide and a locking system by spring and by a clip cooperating with the guide.

In embodiments, the station is mounted on a vehicle.

In embodiments, the station includes at least one station tank.

In embodiments, the station tank comprises at least one mixer and one pump associated with a gun.

In embodiments, the station includes a recuperator.

In embodiments, the station is combined with at least one drone or another equivalent vehicle.

The system according to the present invention comprises a logistics station 1 capable of accommodating several types of drones 12 or other equivalent flying vehicles as described and illustrated in detail in the present application. The system is capable, by appropriate means, of placing said drones in a defined position, of locking the drones 12 in the station once said position has been reached, of extracting used and/or empty batteries (or accumulators), of inserting the full batteries and charging the empty batteries that have been removed. In addition, the system allows to load and unload parcels, seeds, treatment liquids or any other load. The station is equipped with an intelligent battery charging system that optimizes battery life and a programmable robot capable of handling any type of payload. A universal battery shell/cage system, easy to insert/uninsert, connect/disconnect thus making the manipulation of batteries possible by a robot.

The station according to the present invention is in particular adaptable to several drones, and capable of handling all types of payloads (liquids, solids, etc.).

In an embodiment, the landing zone 1 preferably comprises a circle 10 on which are fixed three locking systems 11 illustrated in FIG. 1. Of course, it is possible to provide another number of locking systems (e.g. more than three). Each locking system 11 comprises for example guides (illustrated in the form of rollers) which can move and hold the arms of the drone. FIG. 1 illustrates the circular landing zone 10 with three locking systems which are open.

Figure 2:
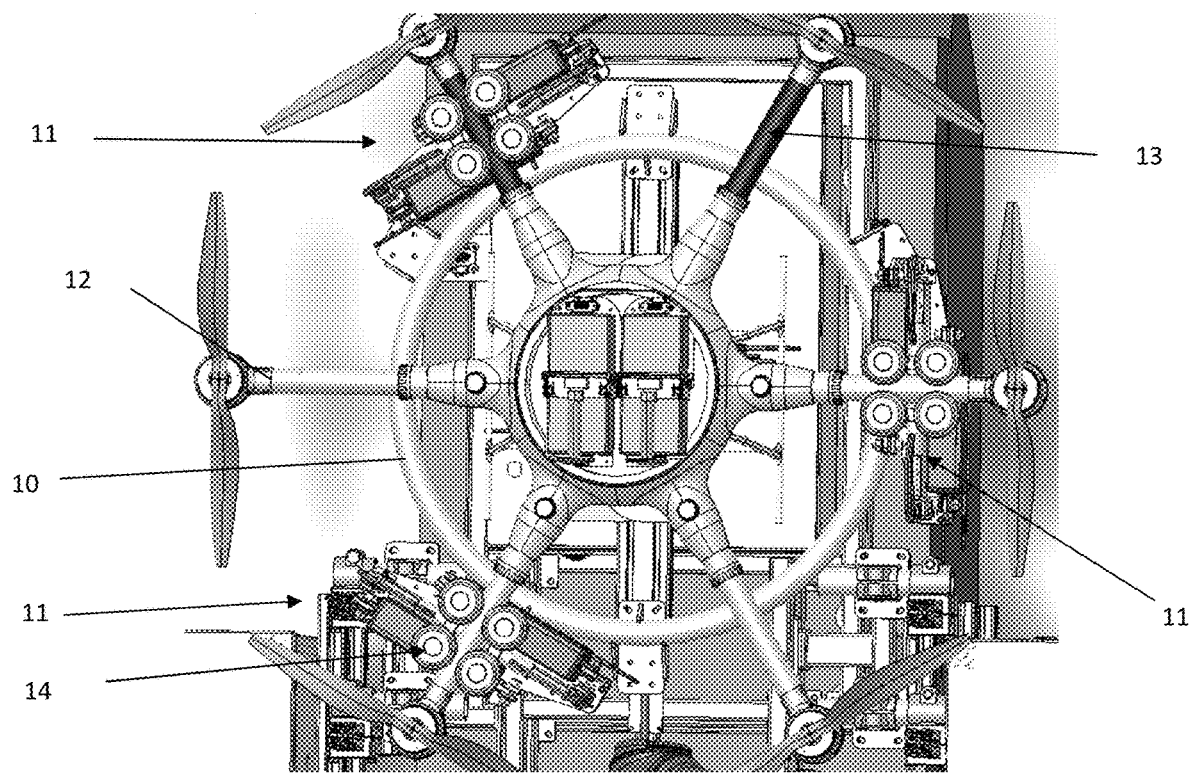
FIGS. 2 to 6 illustrate parts of an embodiment of the invention.

As illustrated in FIG. 2, a drone 12 lands in the center of the circle 10 and on its arms 13, the systems 11 lock the arms 13 to hold the drone. The position of the locking systems 11 corresponding to the position of the arms 13 of the drone 12 which is variable and therefore adapts to several types of drones. Preferably, the locking systems 11 are placed to receive a type of drone (for example with six arms as in FIG. 2) or having less than six arms or more than six arms. Preferably, three locking systems 11 are used as shown.

The station is preferably adaptable to several drones (for example with three arms or more), the space under the drone is left free, the drone lands on its arms and is held stably in position, see FIG. 2 which illustrates the circular landing zone with a drone 12 locked.

Figure 3:
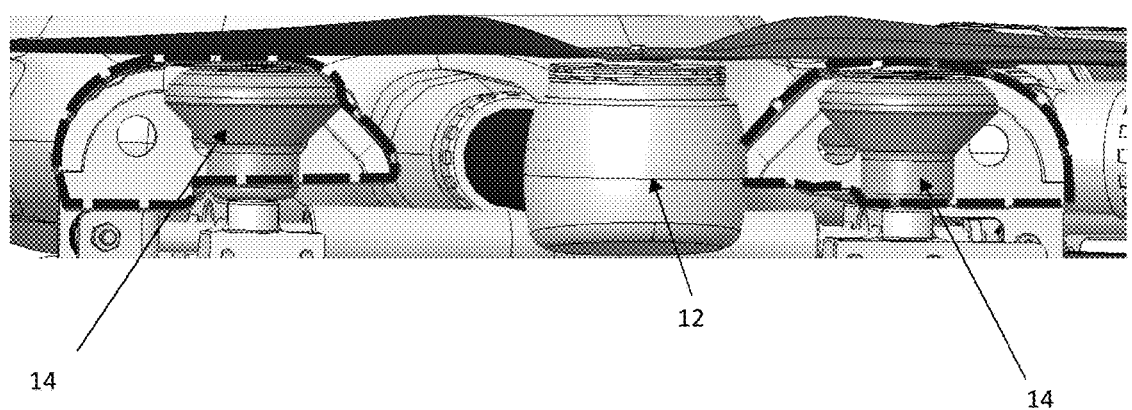

The landing zone comprises guides 14 in the form of rollers (circled in FIG. 3 which illustrates guides for precision landing) making it possible to steer the drone 12 in the station and thus guarantee a precision landing in the center of the locking system. The guides 14 "pinch" the arm of the drone to be held. The guides 14 are preferably free to rotate to allow adjustment of the position of the drone when the three locking systems close on the arm of the drone (FIG. 2).

This system allows a great precision, (the GPS includes a tolerance of plus or minus 1 meter reduced to 5 centimeters) which places the drone in a reference position which is known.

Figure 4:
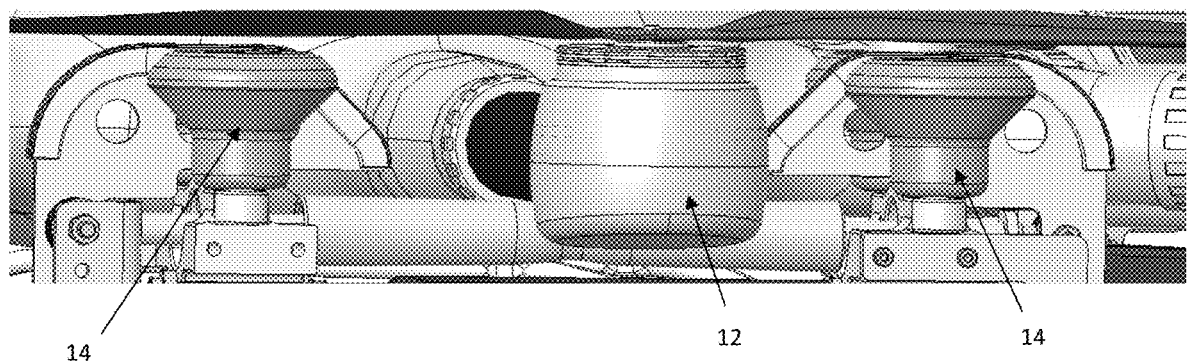
Figure 5:
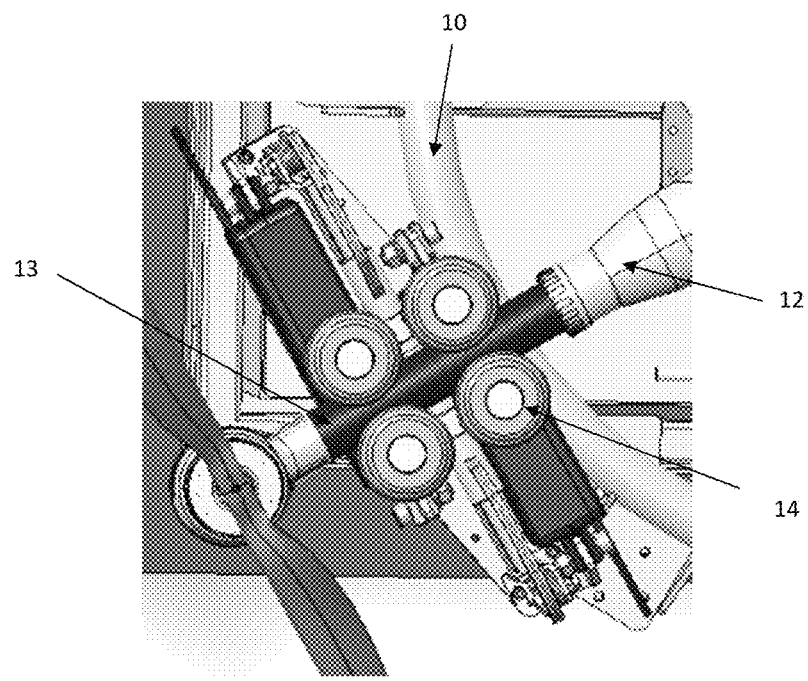

Each of the locking systems 11 comprises for example 4 rollers 14 ensuring proper sliding of the drone 12 when it is locked, see in particular FIGS. 4 and 5. These rollers 14 are mobile and can move towards each other to hold the arms of the drone, see FIGS. 1, 2, 4 and 5. In FIG. 4 (or 1), they are "open" i.e. far from each other while in FIGS. 2 and 5 they are "closed" i.e. close to each other.

FIG. 4 illustrates the open rollers 14 seen from the side and FIG. 5 illustrates the closed rollers seen from above.

Figure 6:
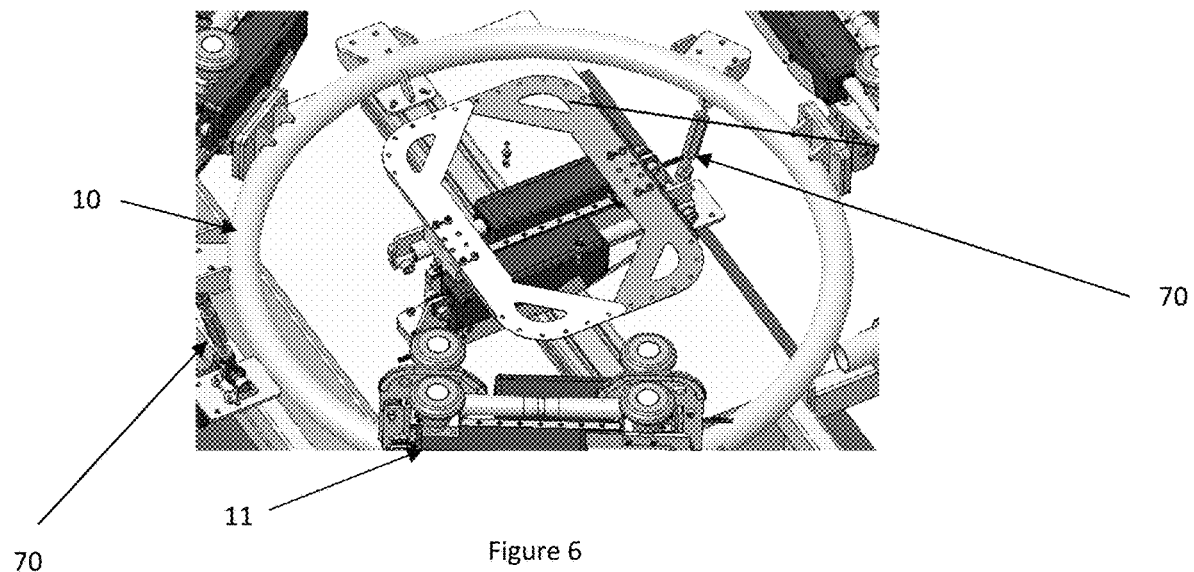

The center of the landing zone is preferably empty, this keeps the passage free for the on-board equipment (packages, camera, detection tools, etc.) as illustrated in FIG. 6 which shows the landing zone free in the center.

As a result, the drone 12 can carry bulky payloads and still land on the station.

Figure 7:
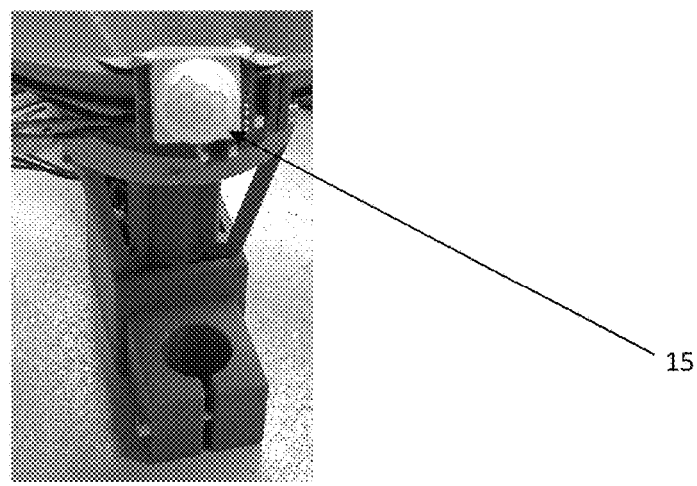
FIG. 7 illustrates a sensor used in embodiments of the invention.

According to embodiments, the station is equipped with motion detection sensors 15 to stop landing or take-off in the event of intrusion by a third party into the zone. FIG. 7 illustrates such a motion sensor 15.

An advantage of this feature is increased safety around the station to avoid an accident to people, for example, or damage to the drone.

Figure 8:
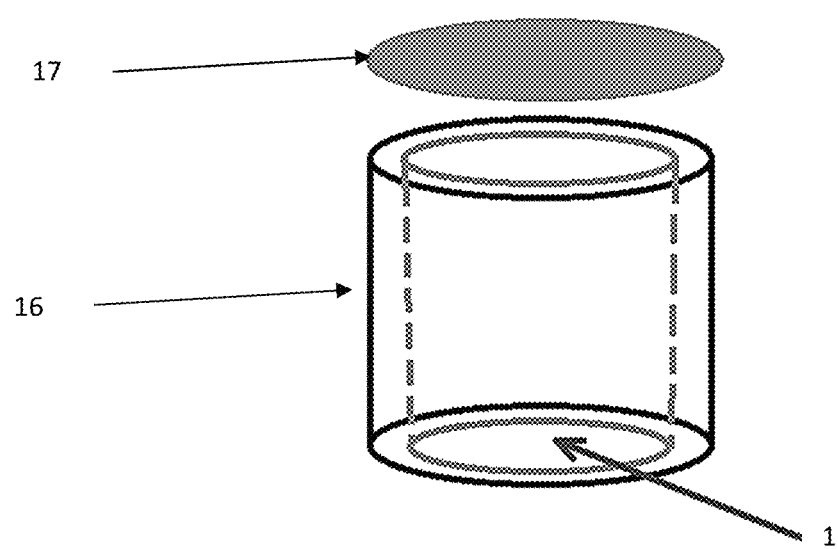
FIG. 8 illustrates a dome used in embodiments of the invention.

In embodiments, a dome 16 can surround the station in order to maintain constant flight conditions during the descent of the drone 12. The dome 16 is preferably equipped with a retractable roof 17 which opens and closes only during the landing/take-off phases to protect the equipment from bad weather and for example from external influences such as wind. FIG. 8 shows a diagram of a dome and a retractable roof.

Advantages include the stabilization of wind disturbances during landing, protection against rain, protection against vandalism.

Preferably, the station coordinates the drones 12 during the approach and waiting phases. It prioritizes drone landings based on the flight states and battery states of each drone and/or UAV (Unmanned Aerial Vehicle) or other criteria. It is therefore preferably associated with electronic means 76, see FIG. 28I, such as one or more computers and means of communication such as a wireless network which determine the position of the drones and can organize a landing and/or take-off order and/or other drone actions, as a control tower in an airport. Different criteria can be used such as: the state of the batteries, the urgency in relation to a load transported or to be transported, the weather and the conditions of the environment, etc. The drones preferably communicate permanently with these electronic means to transmit status information (for example the position of the drone, the state of charge of the batteries etc.) and to receive commands (for example movement, landing, waiting etc.). This management can be automated and/or programmed and/or controlled by an operator, for example depending on the mission of the drone(s) and/or the action to be taken. The management can be mixed, either partially automated, partially programmed and partially carried out by an operator. The distribution of management can vary over time or circumstances: for example an operator can "take over" in the event of a problem or choose automated actions (for example for a take-off or landing etc.) or act by remote control.

An advantage of this realization is the centralization of flight data (battery status, . . . ) of each drone and management of the UAV network by communicating with all the drones and vehicles concerned.

In embodiments of the invention, the battery charging system is intelligent and allows longer battery life. To this end, the system optimizes the charge in particular in relation to the temperature and the state of the battery. Other parameters can be implemented, for example the age of the battery, the number of charge cycles it has undergone.

An advantage of this way of doing things is an optimization of the battery life using an intelligent management system.

Figure 9:
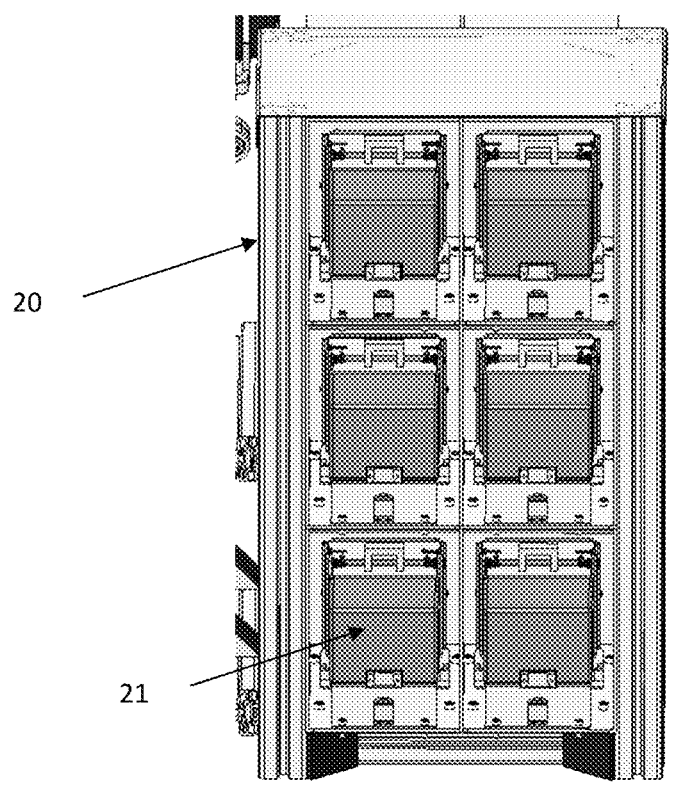

In embodiments of the invention illustrated in FIG. 9 which shows a zone for storing and charging the batteries, the zone for charging the batteries is made up of a "cartridge" 20 of batteries 21 that is entirely modular. If the customer wants to increase the capacity of the station because several drones 12 must be replenished, it suffices to add a "cartridge" itself comprising several batteries.

An advantage of these embodiments and the total modularity of the storage of the batteries 21, the possibility of having a very imposing number of batteries and of different types, for different drones 12.

Figures 10, 11:
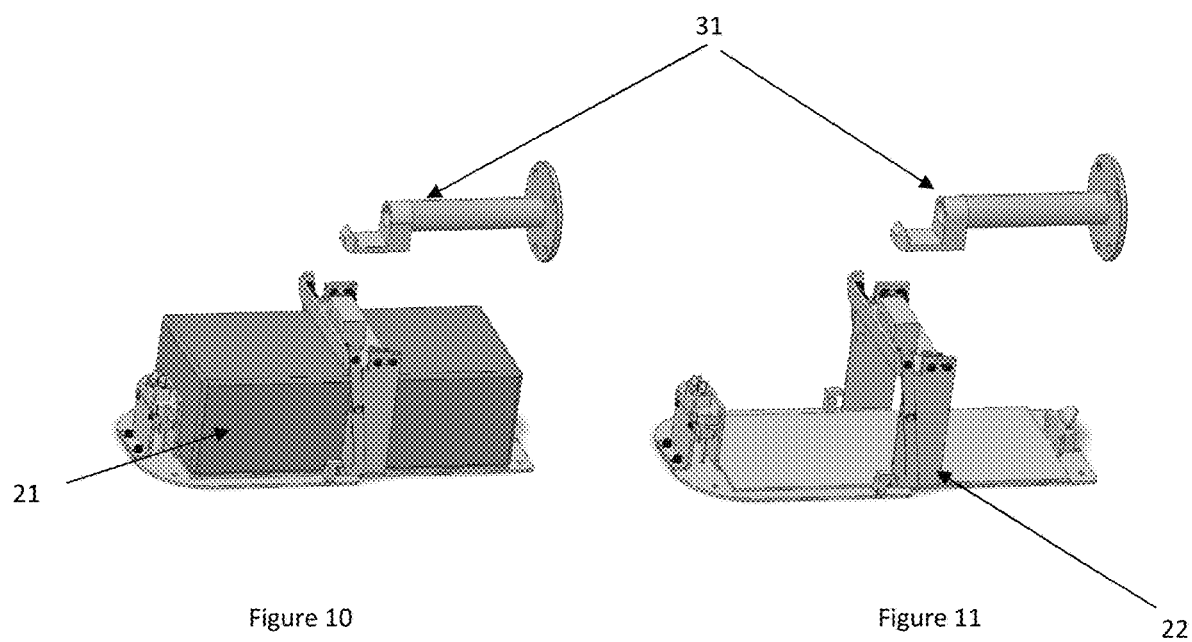
Figures 12, 13:
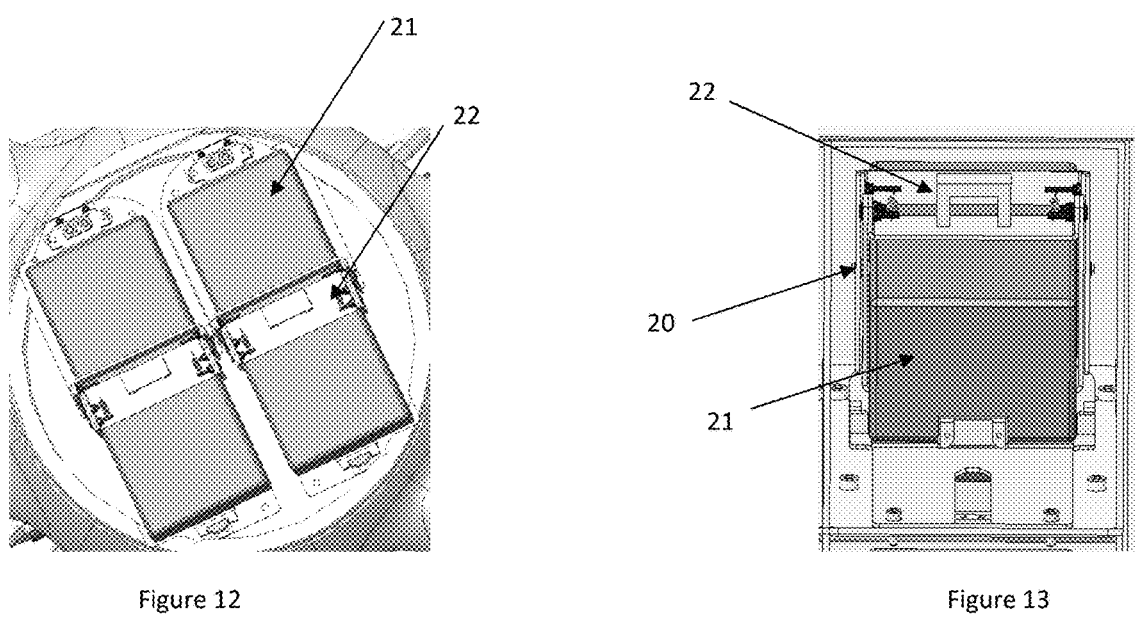

Batteries 21 can be attached to a shell/cage 22 forming a universal attachment system as shown in FIGS. 10-11 which show battery cages, batteries, fixed mounts and a robot finger 31. FIG. 12 which shows a fixed rack in a drone with batteries and cages and FIG. 13 which shows storage with batteries and cages. It is these shells 22 which are placed in the drone 12 and in the battery storage 20. These shells 22 allow the fixing of batteries of different capacities available on the market. This universal system, easy to insert/uninsert, connect/disconnect, makes handling of the batteries 21 possible by a robot 30 for example (see FIG. 16).

An advantage of this system is that it is adaptable to all types of batteries, makes handling possible by a robot.

Figure 14:
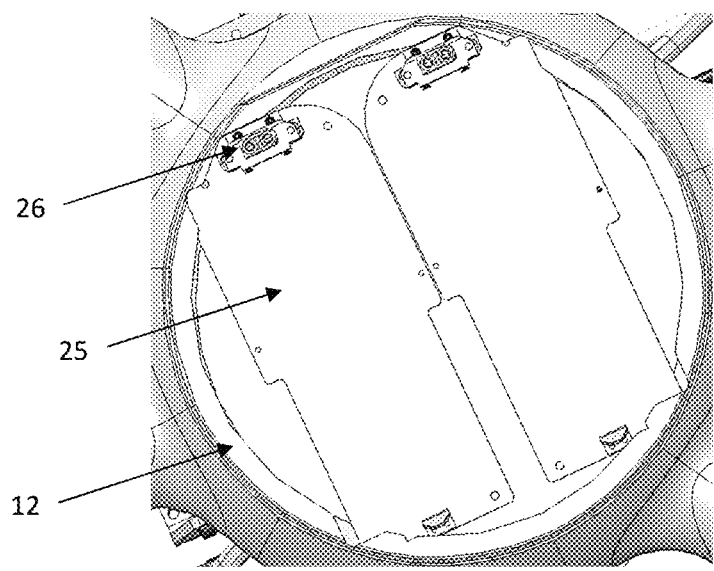

In embodiments illustrated in FIG. 14 (which shows fixed reception plates 25 for a shell 22 with connectors 26 on the drone 12 for mounting the batteries) for example, the locking of the shell is ensured by guides and a locking system by spring as well as by the friction of the power connectors and by a clip which presses the male guide of the shell on the female guide of the battery reception module positioned under the drone.

An advantage of this system adaptable to all types of batteries, simplified and reliable power connection contact.

Figure 15:
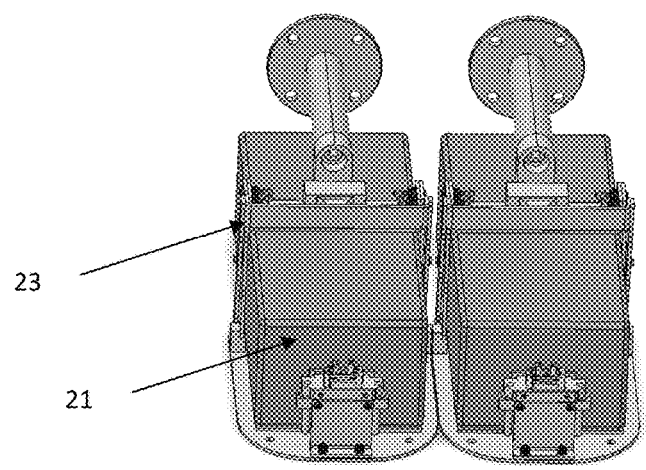

In embodiments illustrated in FIG. 15 which shows compact battery cages, a module 23 for receiving the battery 21 is used to accommodate the shells in the drones and in the storage and loading space. These modules 23 are once again adaptable to several types of drone.

An advantage is the standardization of the position of the battery 21 of the drones 12.

Figure 16:
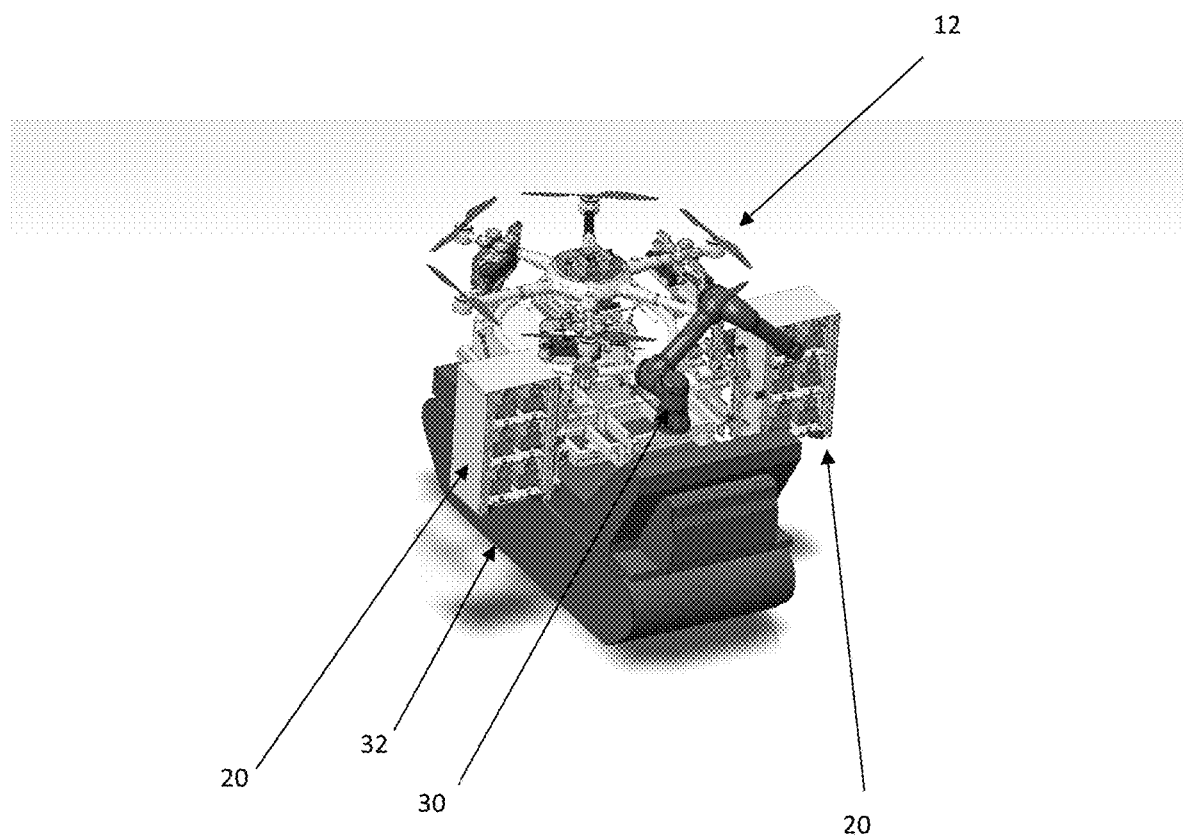
FIG. 16 illustrates a general view of the invention.

FIG. 16 is a general illustration of an embodiment of the station according to the present invention comprising the elements described above with reference to the preceding figures. The station notably comprises a landing zone with battery cartridges 20, a drone 12 and the robot 30 which is used to replace the batteries and load/unload the drone according to the principles of the present invention. Reference 32 schematically illustrates a vehicle used to carry the station. This vehicle can be for example a truck, a trailer, a tracked vehicle, a tank such as a military tank etc. The principle of this construction applies to all the embodiments of the present invention as described in the present application.

Figure 17:
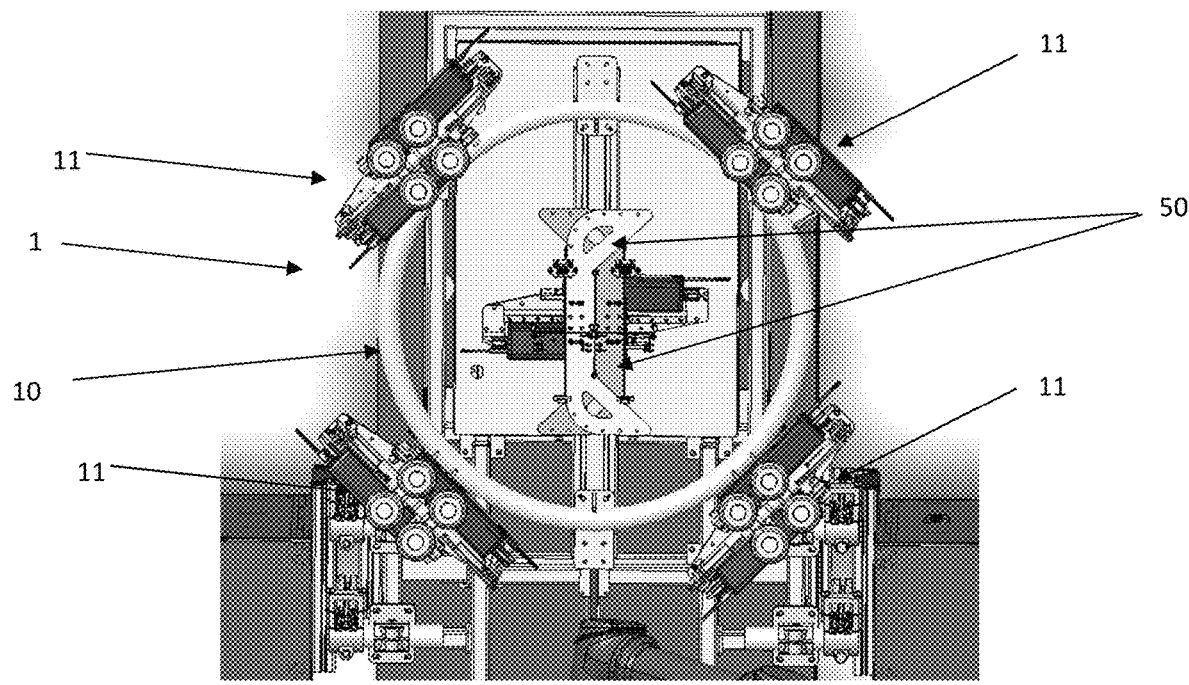
FIGS. 17 and 18 illustrate another embodiment of the invention.
Figure 18:
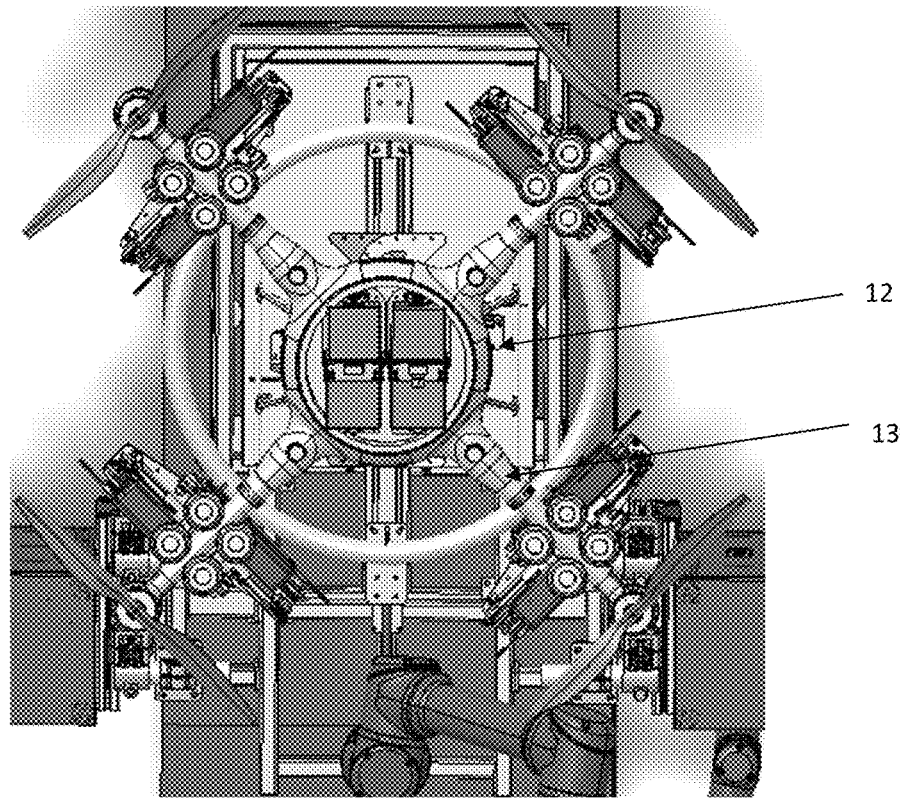

FIGS. 17 and 18 illustrate another embodiment of the invention with a The landing zone 1 which comprises a circle 10 on which are fixed four locking systems 11. The drone 12 lands in the center of the circle 10 and on its arms 13, the systems 11 lock the arms. The position of the locking systems 11 corresponding to the position of the arms of the drone which is variable and therefore adapts to several types of drones. Depending on the number of arms of the drones, it may be preferable to use a four-locking system 11 rather than three as described above and illustrated in FIG. 1 for example.

FIGS. 19 to 23 illustrate another embodiment of the batteries 21 and their support. The batteries are fixed on a shell/cage 22'. It is these shells that are placed in the drone and in the battery storage. These shells allow the battery to be attached to different capacities available in the market. This universal system, easy to insert/uninsert, connect/disconnect, makes it possible to handle the batteries by a robot and horizontally.

Figure 19:
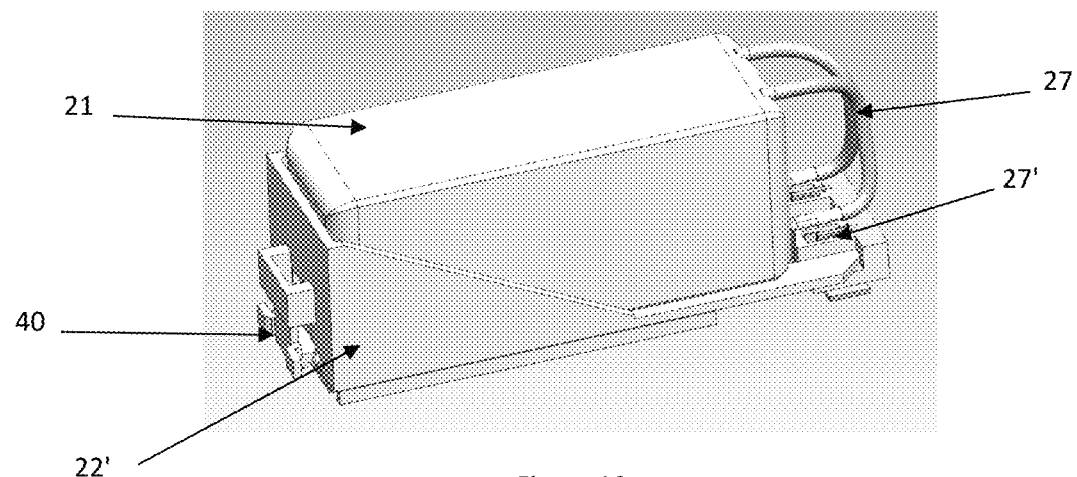
FIGS. 19 to 23 illustrate an embodiment of batteries with a support and fixing means.
Figure 20:
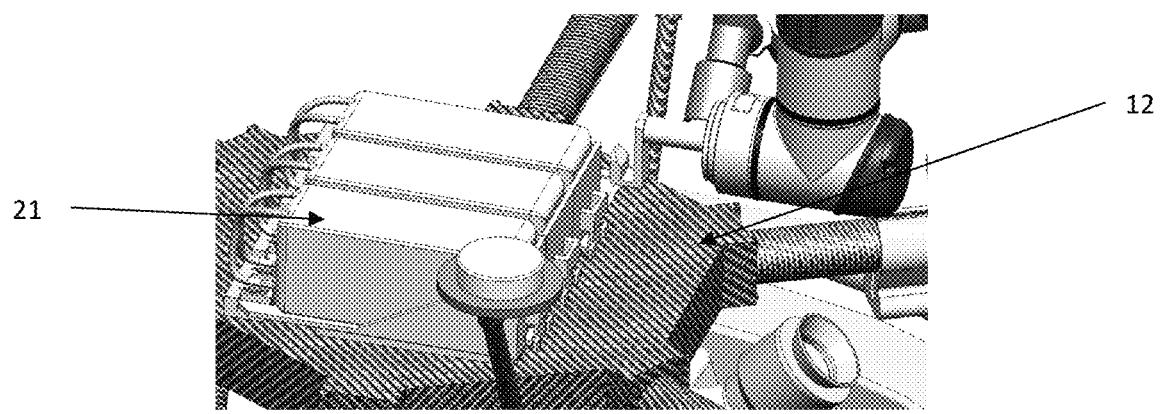

Specifically, as illustrated in FIG. 19, this system comprises a battery 21 which is mounted in a shell 22', the latter being standard but adapted to the battery 21. Wires 27 electrically connect battery 21 to contacts 27'. FIG. 20 illustrates batteries 30 mounted in a drone 12.

Figure 21:
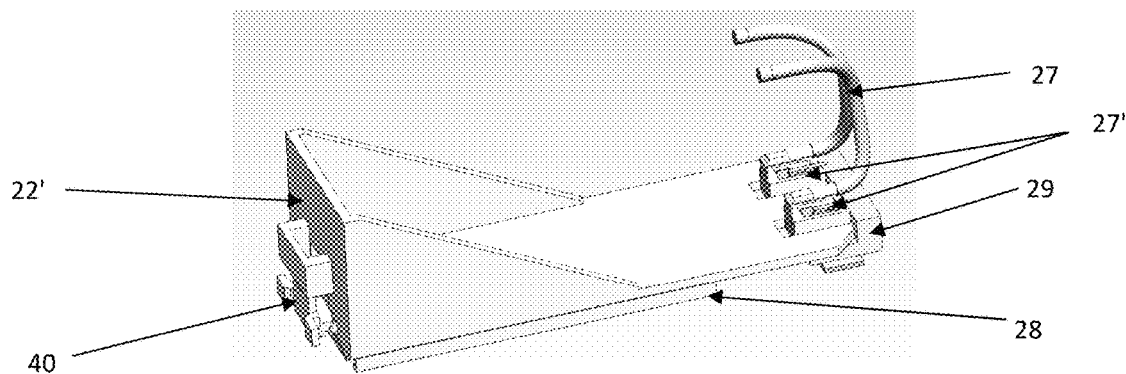

FIG. 21 more specifically illustrates the shell 22' with the contact wires 27 to the battery 21.

Figure 22:
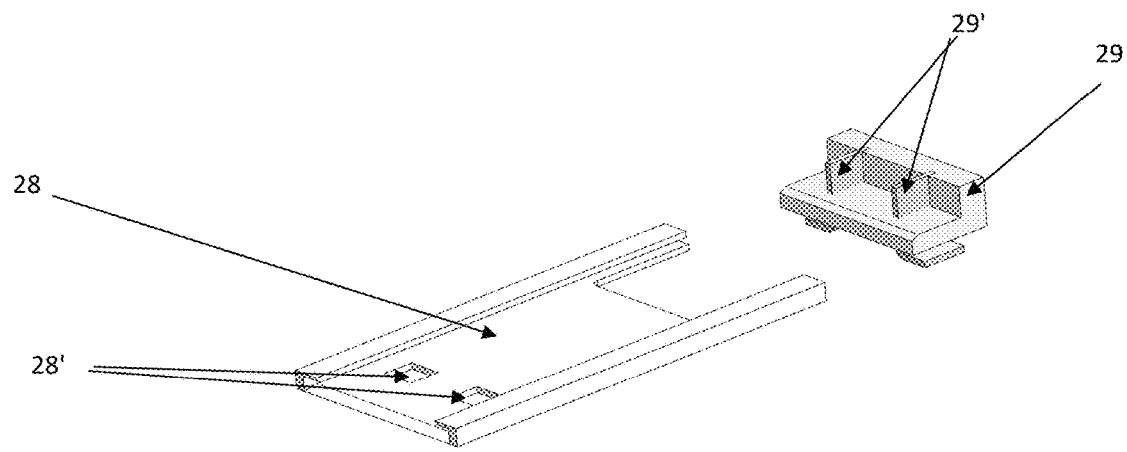

FIG. 22 illustrates the means used on the drone or in the storage/charging system to receive the battery 21 and its shell 22'. These means comprise a support 28 and contacts 29' on a contact support 29 intended to come into contact with the contacts 27' of the shell 22' (illustrated in FIG. 21). The assembly of the shell 22' on the support 28 is done for example by sliding from left to right in FIG. 22 and once the sliding is complete the contacts 27' of the shell 22' are in contact with the contacts 29' of the drone 12.

Figure 23:
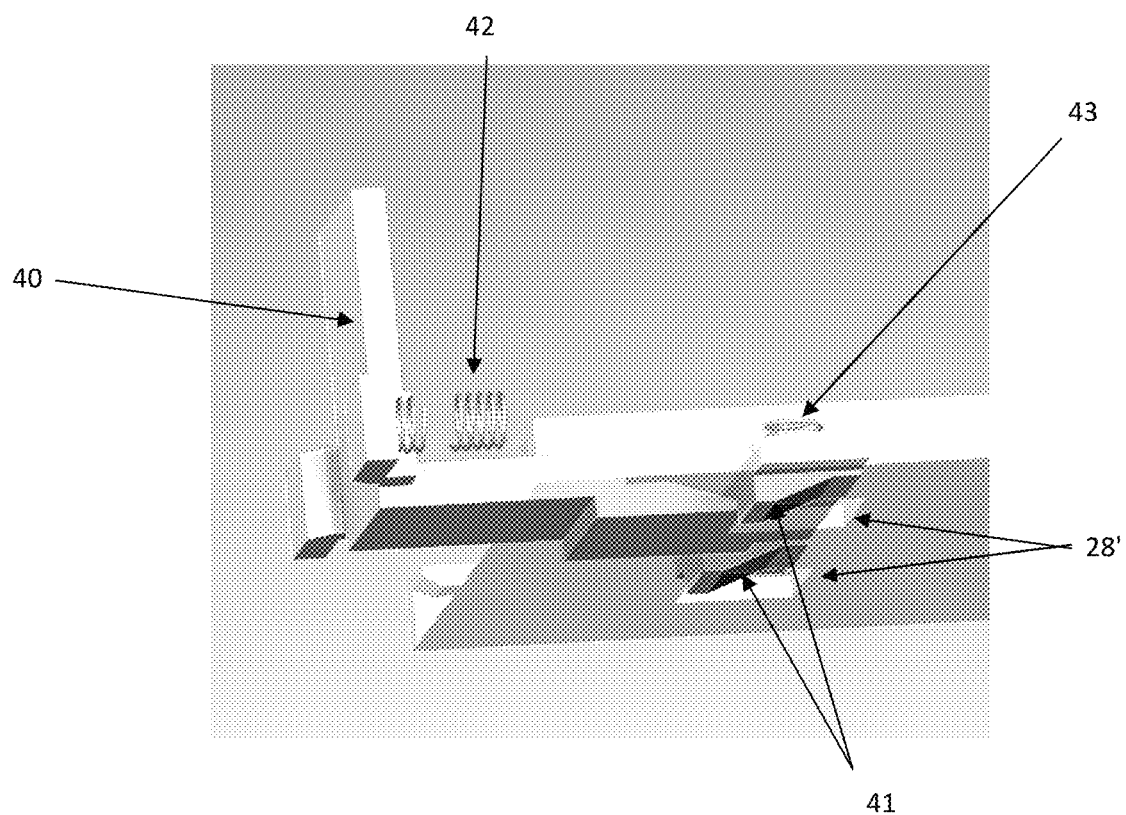

In order to lock the shell 22' in position once mounted (e.g. by sliding), the shell 22' comprises locking means illustrated in FIG. 23. These locking means comprise, for example, an "L" clip 40 comprising ramps 41 at one end. These ramps 41 are intended to enter the openings 28' of the support 28 to lock the shell 22' in position. The ramps 41 are held in the openings 28' by pressure springs 43. To remove a shell 22' (and the battery 21) from the support 28, the robot 30 will press the "L" 40 against the spring 42 which will move the ramps 41 into the openings 28'. As they have an inclined plane, everything will go up against the spring 43 and come out of the opening 28' which releases the lock and allows the extraction of the shell 22' by sliding (for example towards the left in FIG. 19).

FIGS. 24A to 24D illustrate another embodiment of the drone blocking means 12. In this embodiment, the blocking means do not block the arms of the drone but are located under the drone and hold and center the drone 12 by its feet and lock it in the good position. These means use in particular two sliding plates 50 which are separated from each other when the drone 12 lands and approach each other after landing to "pinch" the feet 12' of the drone 12. FIGS. 24A and 24B illustrate the plates 50 in the closed position and FIGS. 24C and 24D in the open position. These plates 50 can also be used with the embodiment of FIG. 1 (for example) of the station 1 and form an alternative or a complement to the blocking means 11 of the embodiments. They are moved laterally for example by means of actuators and/or slideways and/or endless screws.

Elements are preferably added to the drone to allow complete locking and mooring, for example suitable supports or fasteners for their pinching by the plates 50.

This system can be used for multicopter drones with arms that are too short or inaccessible, but also for other types of VTOL drones (eg fixed wings or helicopters) and other UAVs.

Figure 25:
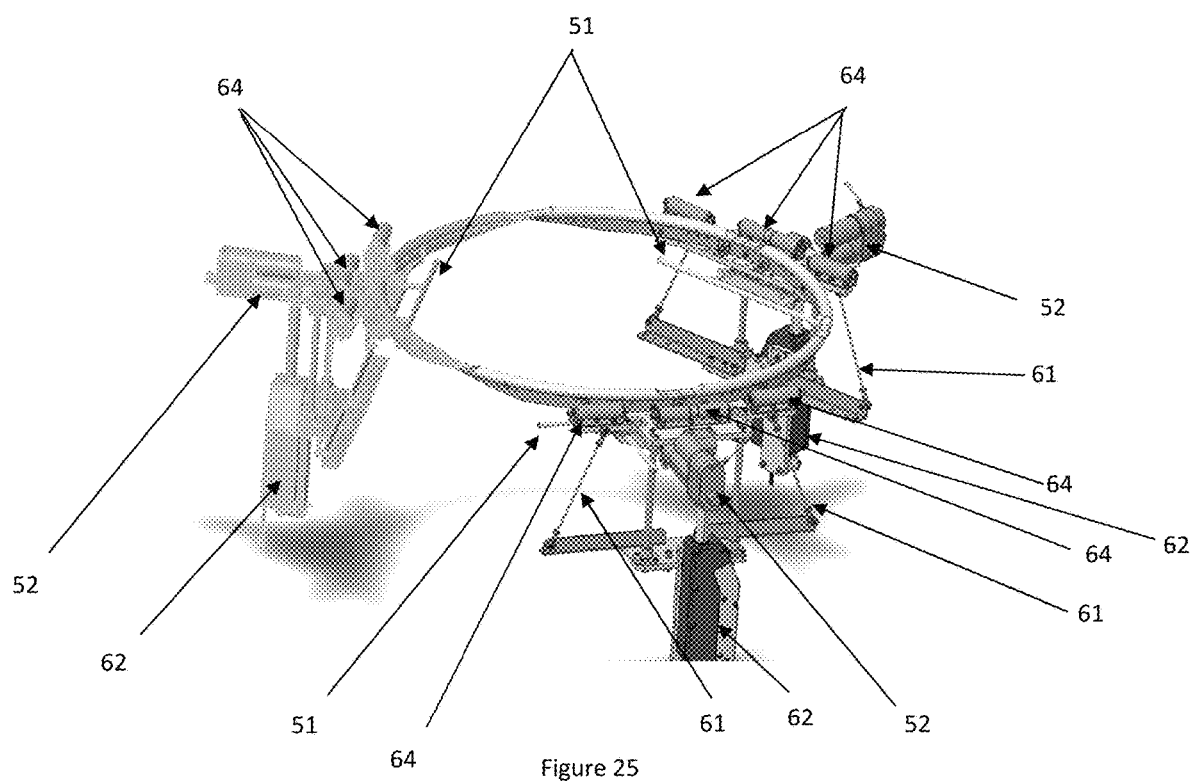
FIGS. 25 and 26 illustrate centering means according to embodiments of the invention.
Figure 26:
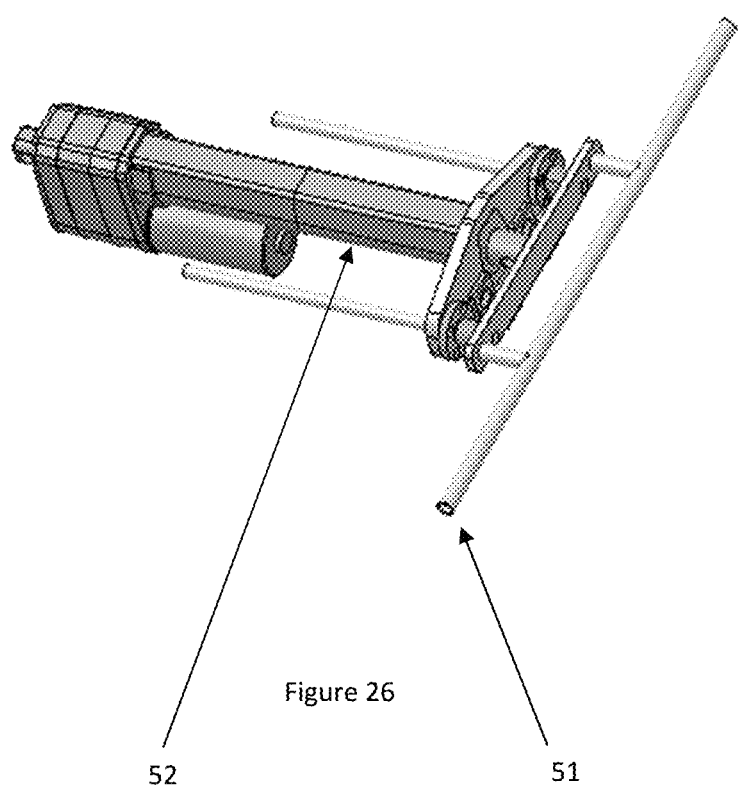

FIGS. 25 and 26 illustrate drone centering means. They comprise in particular a centering bar 51 mounted on an actuator 52 able to move it to the right in FIG. 26. As the station illustrated in FIG. 25 comprises three of them distributed at 120° (for example), the displacement of the bars 51 towards the center of the station will have the effect of centering the drone which has landed.

These centering means can be used in all embodiments of the invention. In FIG. 25, it is the embodiment of FIGS. 27A to 27F which is illustrated with the rollers 64, the tie rods 61 and the actuators 62.

Figure 27A:
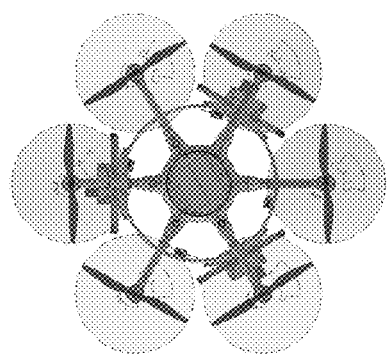
FIGS. 27A to 27F illustrate an embodiment according to the invention of means for retaining a drone.
Figure 27D:
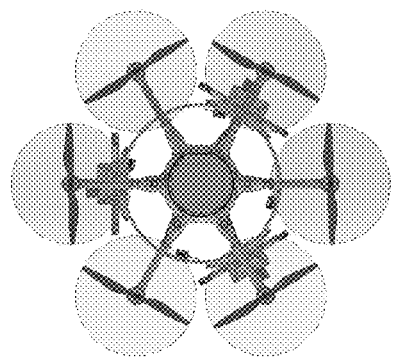
Figure 27B:
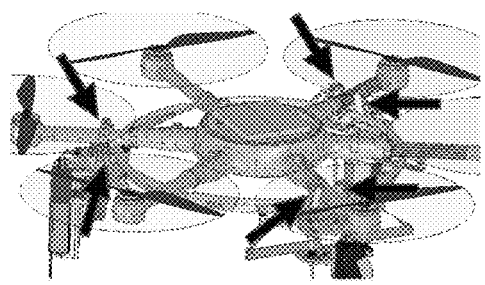
Figure 27E:
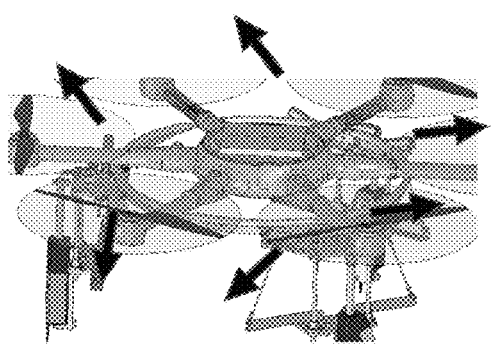
Figure 27C:
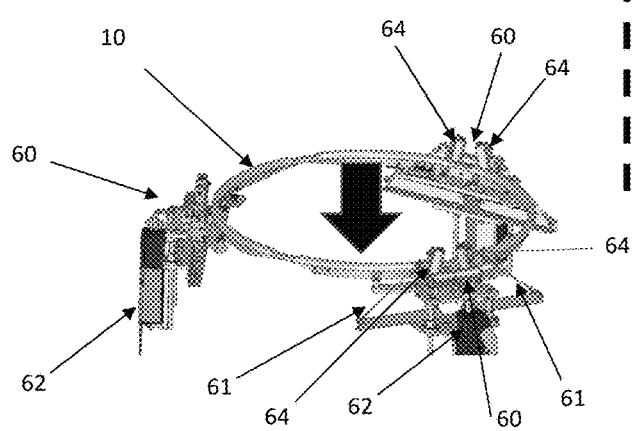
Figure 27F:
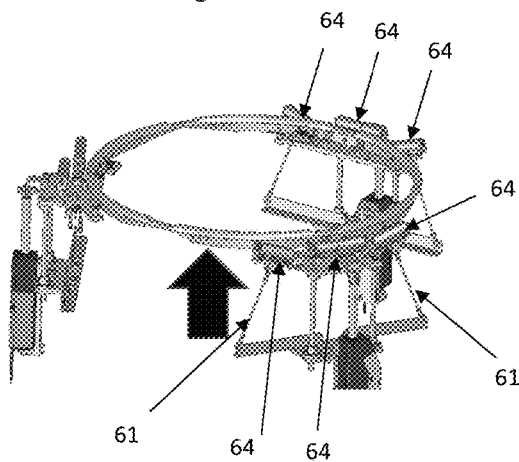

FIGS. 25, 27A to 27F illustrate one embodiment of a station according to the present invention. This station has the characteristic in particular of an automatic raising and lowering of the level of the landing zone 1, namely of the circle 10, for the landing and takeoff of a drone for example. The locking/docking systems 60 (for example in the form of rollers) close and correct the position of the drone when the landing zone descends and opens as the landing zone rises to release the drone for take-off. FIGS. 27A to 27C illustrate the system in the closed state when the landing zone 1 is in the low position: in this position, the drone 12 is held by locking means 60 according to the principles of the present invention. FIGS. 25, 27D to 27F illustrate the landing zone 1 in the high position, i.e. open: in this position the drone 12 is no longer maintained and can take-off or land. The passage from the high position to the low position and vice versa is carried out by actuators, such as cylinders as shown (three locking systems 60 have been shown, but there may be more). The locking means 60 can be actuated directly by the movement of the landing zone, for example by tie rods 61 which cause the rollers 64 of the locking means 60 to move from an open position (FIG. 27F) to a closed position (FIG. 27C). Alternatively, it is possible to use an independent control of the locking means 60 which does not depend directly on the position of the circle 10. The arrow in FIGS. 27B and 27E illustrate the movement of the locking means. The vertical movement of zone 1 can be achieved for example by mechanical, fluidic actuators 62, with guidance (for example on slides) or not. Each of the locking systems 60 comprises for example three rollers 64 ensuring proper sliding of the drone 12 when it is locked, see in particular FIGS. 27A, B, D, E. These rollers 64 are mobile and can tilt to hold the drone arms, see FIGS. 27C and 27F. In FIGS. 27D, E and F they are "open" i.e. away from each other while in FIGS. 27A, B and C they are "closed" i.e. close together and holding the drone (FIG. 27B).

Figure 28A:
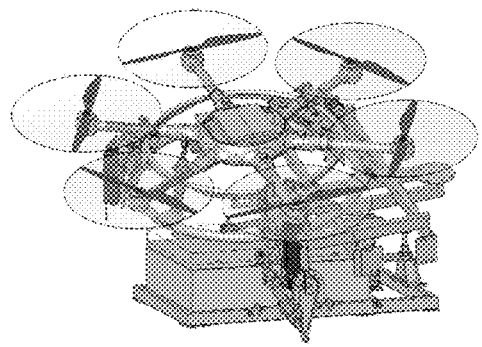
Figure 28B:
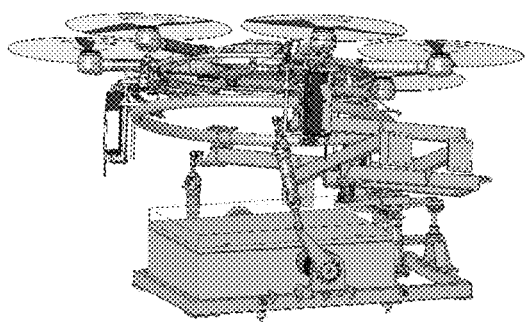
Figure 28C:
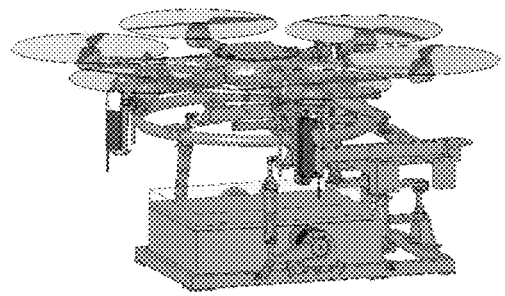
Figure 28D:
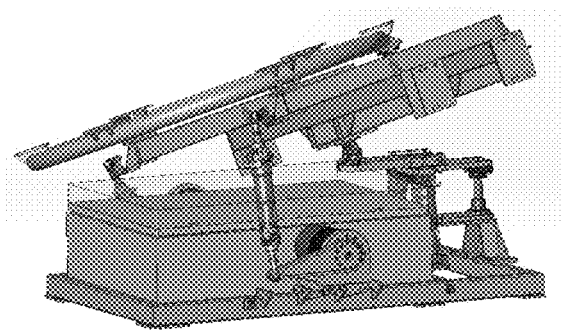
Figure 28E:
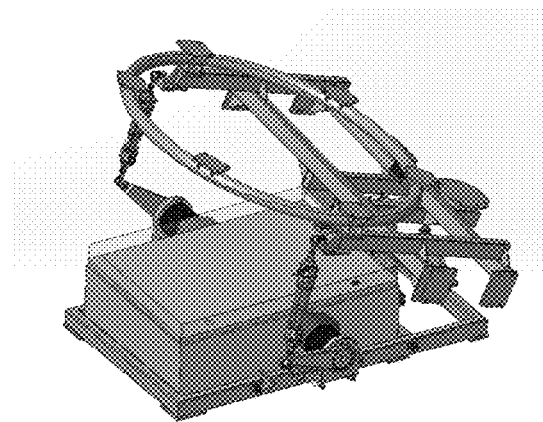
Figure 28F:
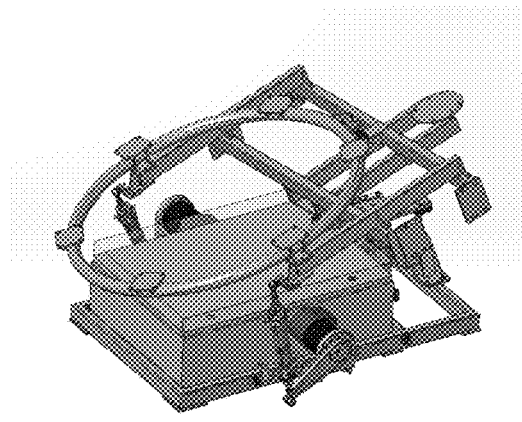
Figure 28G:
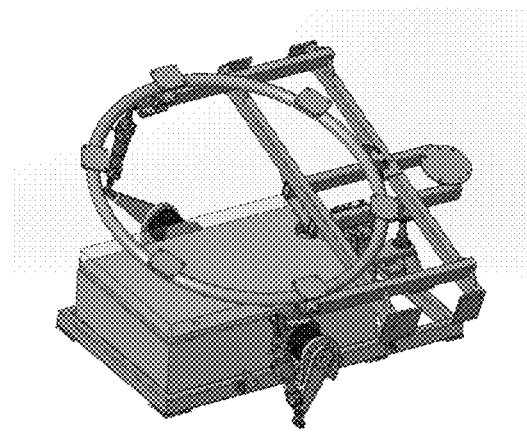
Figure 28H:
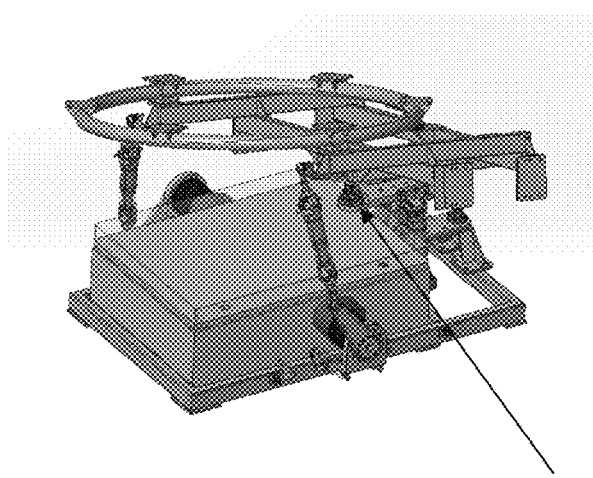

FIGS. 28A to 28K illustrate embodiments of a landing zone 1 whose level (or "attitude") relative to the terrain is controlled, preferably automatically, and can be modified as illustrated in the figures (leaning forward, backward, right or left etc., see FIGS. 28A to 28H). Such a zone 1 is useful, for example, if the system is mounted on a vehicle 32 which moves over terrain that is not flat. It is thus possible to correct the position of zone 1 (circle 10) so that it remains permanently horizontal or essentially horizontal (or in another desired position) independently of the position and orientation of the carrier vehicle 32. The adjustment can be made static (vehicle 32 stopped) or dynamic (vehicle 32 moving). The setting can be done manually or automatically. The means implemented are in particular two supports 70 of the zone (preferably with shock absorbers 71) linked to motors 72 and a support 73 attached to a fixed point 74 through a hinge 75. As can be seen in these figures, this construction makes it possible to move the landing zone in several directions relative to the support. FIGS. 28J and 28K show construction details of the system (support 70, damper 71 and motor 72). These adjustable supports 70 are also visible in FIGS. 1 and 6 and can be manually or automatically adjusted (for example with a controlled cylinder). Dampers may or may not be present. A fixed point and an articulation similar to those of FIGS. 28A to 28K are also preferably present in the embodiment of FIGS. 1 to 6.

For the adjustment, known means are used to determine the horizontal position or that desired (for example sensors) and the control can be done for example by electronic means (computer, calculator etc.), for example placed in a housing (preferably waterproof).

Figure 28I:
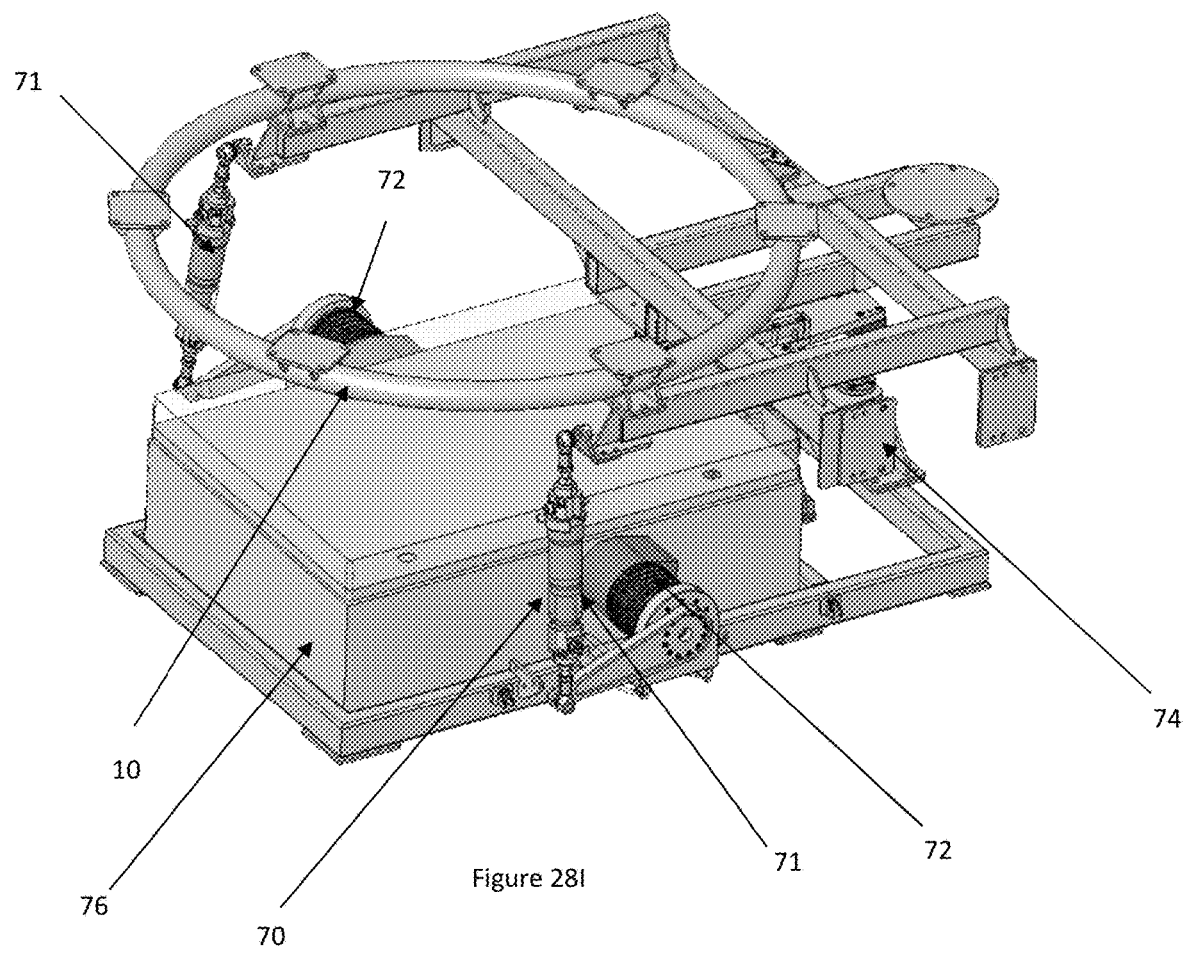

These electronic means and their housing are for example illustrated in FIG. 28I, reference 76. Although not specifically illustrated in all the figures, these means 76 are preferably present in all embodiments of the present invention. More generally, all the elements of the station can be controlled (position, movement, etc.) by these electronic means, computers, computers, appropriate sensors in order to allow remote-controlled, semi-automatic or automatic operation of the station and of these parts and elements (cylinders, actuators etc.). Appropriate means of transmitting commands, information (data, measured values, etc.) are implemented: cables, transmission by waves, etc. The robot 30 is for example formed of an arm comprising several degrees of freedom in rotation and allows so-called "pick and place" movements: grabbing a battery, extracting it from its support (on the drone 12 or in the reservoir 20) and replacing it at its intended destination (for example in the reservoir 20 for its recharging if it comes from the drone 12, or the reverse if it comes from the reservoir 20).

FIGS. 29 to 33 illustrate an embodiment of the means for filling the tank of a drone, for example with a liquid.

Figure 29:
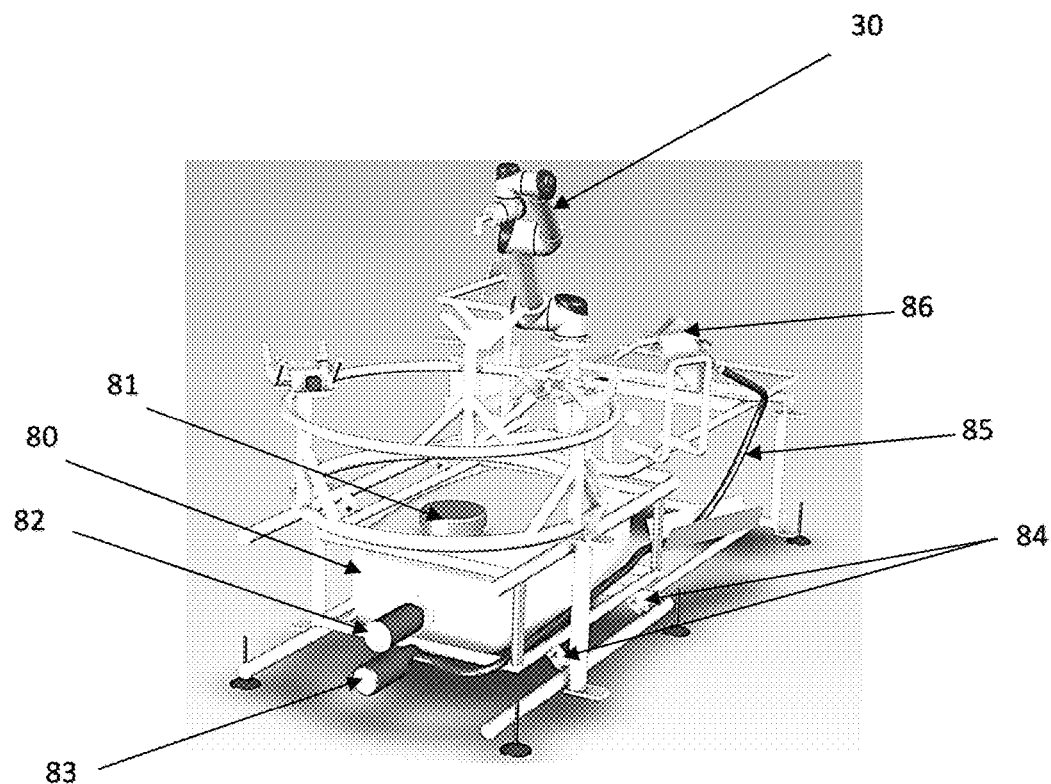
FIGS. 29 to 33 illustrate an embodiment according to the invention of means for refilling liquid in a drone.

These means illustrated in FIG. 29 notably comprise a station tank 80 with a tiller cap 81, a mixer 82 (which makes it possible to maintain movement in the liquid if necessary) and a pump 83. This figure also shows wheels 84 which allow the tank to be moved in order to fill it. The means further comprise a hose 85 connected at one end to the pump 83 and at the other end to a gun 86. In FIG. 29, one also sees the robot 30 which is used to move the batteries and is also used to manipulate the gun 86 as described below. The reservoir 80 is preferably located in the lower part 1' of the station 1 (see FIG. 30) and this part comprises for example doors 88, 88' which make it possible to bring out the reservoir 80 on its rollers 84 in order to fill it.

Figure 30:
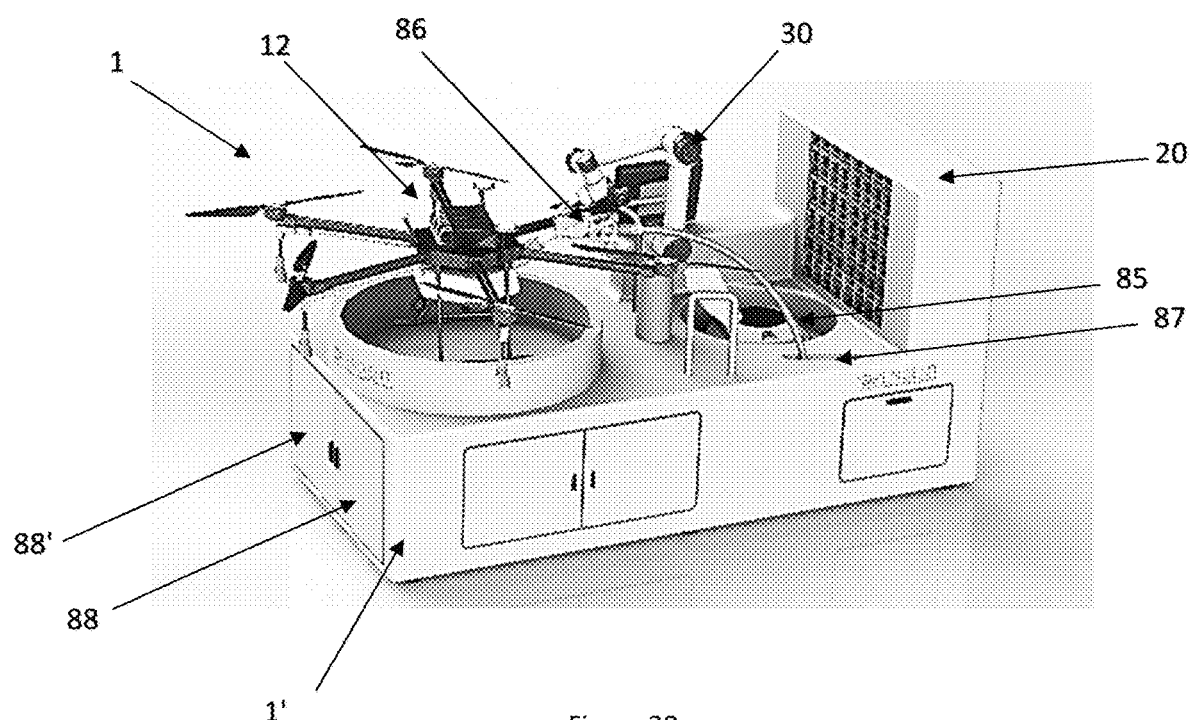

In FIG. 30, one also sees the pipe 85 coming out of a slot 87 of the lower part 1' of the station 1. In this FIG. 30, a drone 12 has landed for liquid refueling (as a load) and is being held in position as described above in accordance with the principles of the present invention.

Figure 31:
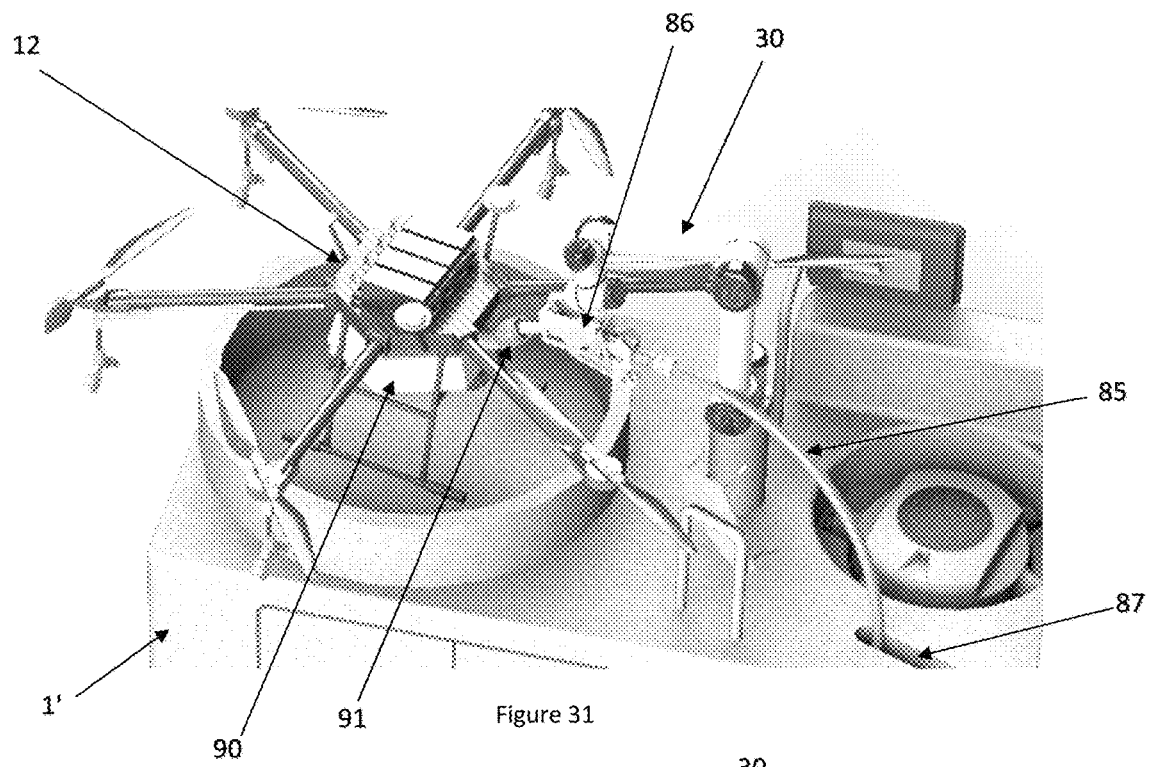

In FIG. 31, the filling of a tank 90 of a drone 12 is illustrated. For this purpose, the gun 86 is brought by the robot 30 and introduced into the chute 91 of the reservoir 90 and the liquid from the reservoir of the station 80 introduced into the reservoir 90 of the drone 12.

Figure 32:
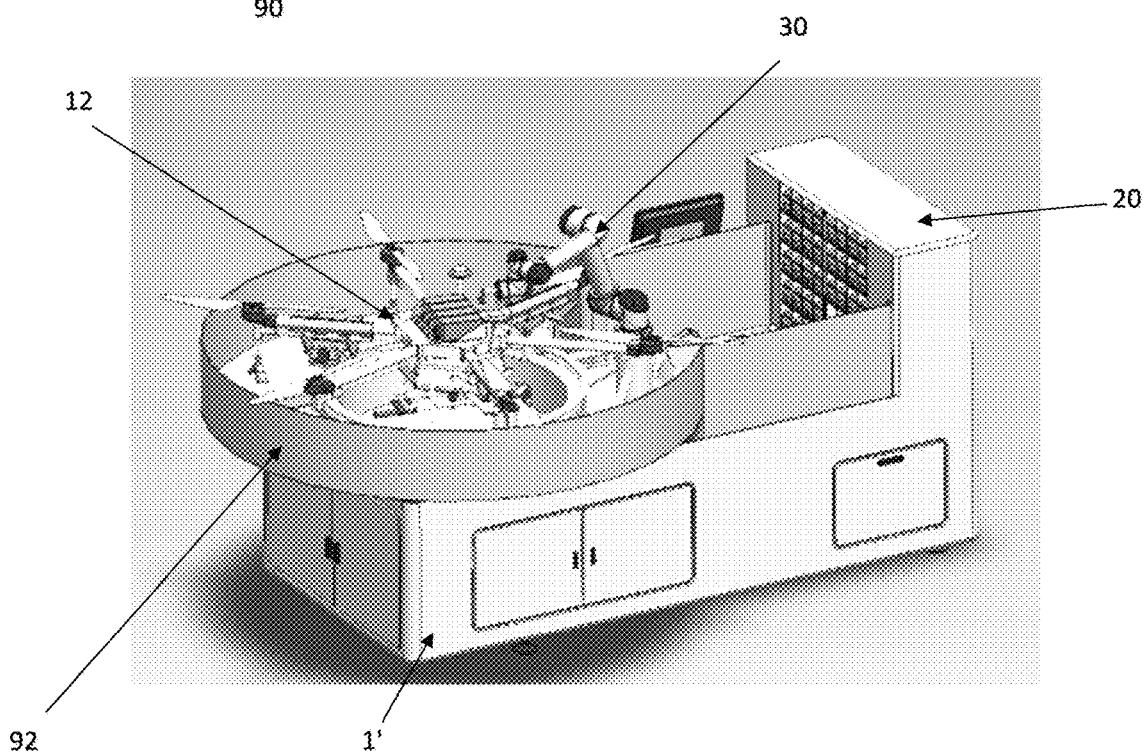

FIG. 32 illustrates station 1 of FIG. 30 to which a liquid recuperator 92 has been added which is useful for recovering liquids which would flow out during filling. The recuperator 92 preferably surrounds the drone and seals the loading area.

Figure 33:
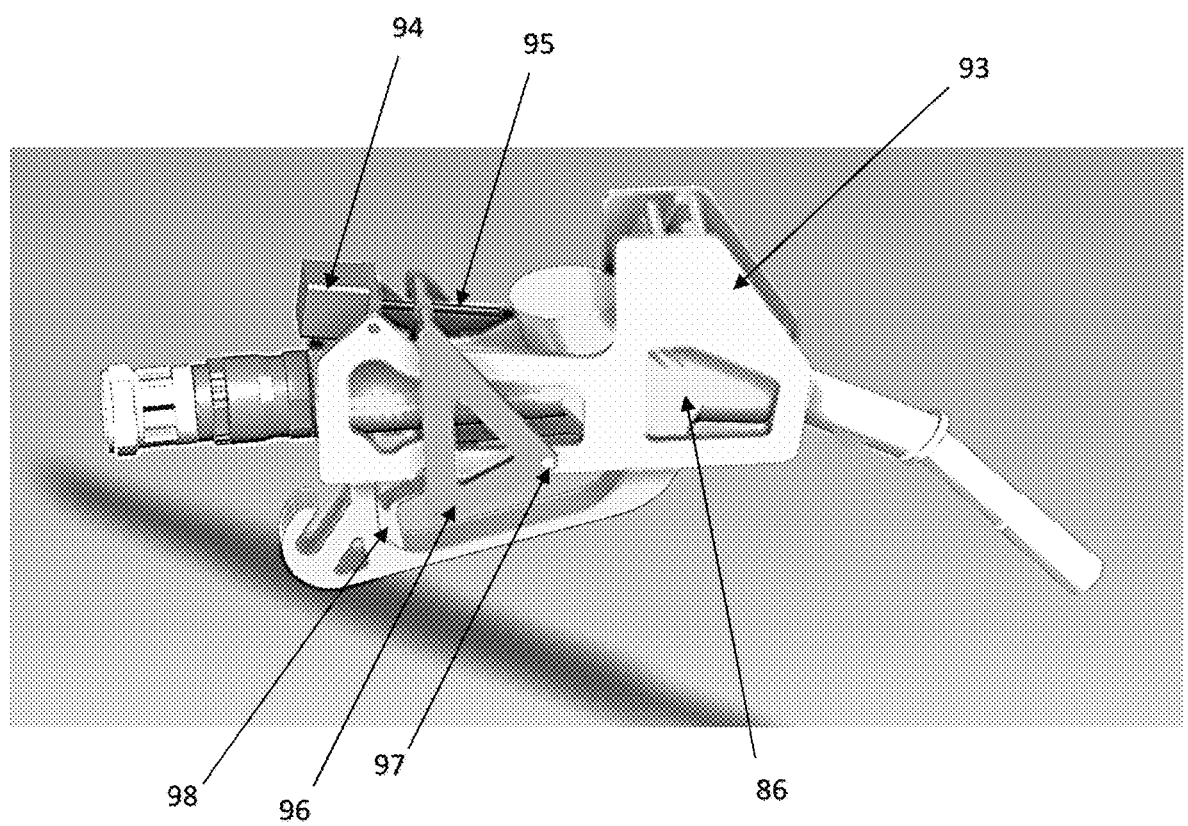

FIG. 33 illustrates in detail one embodiment of the station 1 filling gun 86. The gun 86 is held in a support 93 which allows it to be manipulated by the robot 30 and the support further comprises actuating means. These means are for example a motor 94 linked to an endless screw 95 which acts on an actuating means 96 articulated on an axis 97. The rotation of the screw 95 will tilt the actuating means 96 to the left or the right (depending on the direction of rotation of the screw) and the actuating means by its tilting to the right (in FIG. 33) will press the trigger 98 of the gun 86 and allow the flow of liquid into the reservoir 90 of the drone 12. One rotation in the other direction will release the trigger and interrupt the feed. These means therefore allow a fully automatic operation: the supply of the gun 86 to the reservoir 90 and its introduction into the chute 91 by robot, the pressing of the trigger 98 to allow the passage of the liquid (pressurized by the pump 83 of the reservoir 80 (see FIG. 29), and once the reservoir 90 of the drone 12 is tilled, the liquid supply is stopped and the gun 86 is withdrawn by the robot 30 (and its storage in a predetermined location).

The embodiments described are by way of illustrative examples and should not be considered limiting. Other embodiments may make use of means equivalent to those described for example. The embodiments can also be combined with each other depending on the circumstances, or means used in one embodiment can be used in another embodiment. For example, many embodiments mention the use of a drone but the principle of the present invention can be applied to other equivalent flying objects, for example a helicopter and other UAVs which allow take-off and landing on the station described and illustrated in this application.

The materials used to manufacture the parts of the present invention are any suitable materials: metal, synthetic materials or combinations of materials. Everything is preferably managed by computer means such as one or more computers, information transmission means and wire or wireless controls (Wifi. Bluetooth® etc.). The system for example as illustrated in FIG. 16 in all its embodiments can be mounted on a vehicle 32 (for example an all-terrain vehicle) or a trailer. The use of the system can be military and/or civilian. It is also possible to envisage a system with several stations as described in the present application, identical or different (for example according to different embodiments).

The invention claimed is:

1. A logistics station for flying electric vehicles with at least one battery, the station comprising:
   at least one landing and take-off zone including a maintenance system to maintain a flying electric vehicle of the flying electric vehicles comprising an annular hoop supporting the flying vehicle in the at least one landing and take-off zone with at least one locking system;
   a robot configured to exchange one or more of: (i) the at least one battery of the flying electric vehicle and (ii) a load of the flying electric vehicle; and
   a tank/charger of the at least one battery.

2. The station according to claim 1, wherein the at least one locking system comprises at least three locking systems.

3. The station according to claim 1, wherein the maintenance system further comprises two plates movable relative to each other.

4. The station according to claim 1, wherein the maintenance system including the annular hoop is fixed in the station or movable along one or more axes actuated by an orientation system.

5. The station according to claim 3, further comprising a steering system comprising actuators or motors coupled to supports.

6. The station according to claim 2, wherein the at least three locking systems are along the annular hoop.

7. The station according to claim 6, wherein, when the annular hoop is in a high position, the at least three locking systems are in an open position and when the annular hoop is in a low position, the at least three locking systems are in a locked position.

8. The station according to claim 1, further comprising at least one area to store and to charge the at least one battery.

9. The station according to claim 1, wherein the at least one battery is mounted in a cage with an attachment system.

10. The station according to claim 1, wherein the robot has at least one finger to move the at least one battery in the station.

11. The station according to claim 1, further comprising a centering system that centers the flying vehicle.

12. The station according to claim 1, further comprising a motion detection sensor.

13. The station according to claim 1, further comprising a dome to maintain constant flight conditions during take-off and landing.

14. The station according to claim 1, further comprising a guide and a clip cooperating with the guide,
   wherein a locking of the at least one battery is ensured by the guide, the at least one locking system by spring and by the clip cooperating with the guide.

15. The station according to claim 1, wherein said station is mounted on a vehicle.

16. The station according to claim 1, further comprising at least one station reservoir.

17. The station according to claim 16, wherein the at least one station reservoir comprises at least one mixer and a pump associated with a gun.

18. The station according to claim 16, further comprising a recuperator.

19. The station according to claim 1, wherein the station is combined with at least one drone.

\* \* \* \* \*